United States Patent
Zhang

(10) Patent No.: US 10,546,065 B2
(45) Date of Patent: Jan. 28, 2020

(54) INFORMATION EXTRACTION APPARATUS AND METHOD

(71) Applicant: BOE TECHNOLOGY GROUP CO., LTD., Beijing (CN)

(72) Inventor: Zhenzhong Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 3 days.

(21) Appl. No.: 15/741,732

(22) PCT Filed: Jul. 18, 2017

(86) PCT No.: PCT/CN2017/093321
§ 371 (c)(1),
(2) Date: Jan. 3, 2018

(87) PCT Pub. No.: WO2018/072501
PCT Pub. Date: Apr. 26, 2018

(65) Prior Publication Data
US 2019/0073355 A1    Mar. 7, 2019

(30) Foreign Application Priority Data

Oct. 21, 2016 (CN) .......................... 2016 1 0920441

(51) Int. Cl.
*G06F 17/27* (2006.01)
*G06F 16/31* (2019.01)
*G06F 16/36* (2019.01)

(52) U.S. Cl.
CPC ........ *G06F 17/2785* (2013.01); *G06F 16/313* (2019.01); *G06F 16/36* (2019.01); *G06F 17/27* (2013.01)

(58) Field of Classification Search
USPC .......................................................... 704/9
See application file for complete search history.

(56) References Cited

U.S. PATENT DOCUMENTS 6,182,029 B1 * 1/2001 Friedman ............ G06F 17/2705
   704/9
7,685,141 B2 * 3/2010 Jadhav .................. G06Q 10/10
   707/999.1

(Continued)

FOREIGN PATENT DOCUMENTS

| CN | 102298588 A | 12/2011 |
| CN | 102360394 A | 2/2012 |
| CN | 102495892 A | 6/2012 |

OTHER PUBLICATIONS

International Search Report & Written Opinion dated Oct. 17, 2017, regarding PCT/CN2017/093321.

(Continued)

*Primary Examiner* — Daniel C Washburn
*Assistant Examiner* — Timothy Nguyen
(74) *Attorney, Agent, or Firm* — Intellectual Valley Law, P.C.

(57) ABSTRACT

The present application discloses an information extraction method. The method includes extracting a plurality of candidate entities and a plurality of candidate attributes from a target corpus based on a plurality of entity seeds of one or more target types in an entity seeds set; establishing a plurality of correlations between the plurality of candidate attributes and a plurality of entities including the plurality of candidate entities and the plurality of entity seeds; and selecting one or more target entities from the plurality of entities and one or more target attributes from the plurality of candidate attributes based on the plurality of correlations.

14 Claims, 11 Drawing Sheets

--- extracting a plurality of candidate entities and a plurality of candidate attributes from a target corpus based on a plurality of entity seeds of one or more target types in an entity seeds library establishing a plurality of correlations between the plurality of candidate attributes and a plurality of entities including the plurality of candidate entities and the plurality of entity seeds selecting one or more target entities from the plurality of entities and one or more target attributes from the plurality of candidate attributes based on the plurality of correlations

(56) References Cited

U.S. PATENT DOCUMENTS

| | | | |
|---|---|---|---|
| 10,068,022 B2* | 9/2018 | Pilpel | G06F 16/9024 |
| 10,140,290 B2* | 11/2018 | Carmena | G06F 17/279 |
| 2005/0220351 A1* | 10/2005 | Vanderwende | G06F 16/367 |
| | | | 382/229 |
| 2007/0033221 A1* | 2/2007 | Copperman | G06F 16/367 |
| 2015/0100873 A1* | 4/2015 | Lahr | G06F 17/2785 |
| | | | 715/230 |
| 2015/0278366 A1* | 10/2015 | Pilpel | G06F 16/9024 |
| | | | 707/723 |

OTHER PUBLICATIONS

Automatic Set Instance Extraction Using the Web, Richard C Wang et al., In Proceedings of the 47th annual meeting of the ACL and the 4th IJCNLP of the AFNLP, 441-449, Suntec, Singapore, Aug. 2-7, 2009.

"More Like These": Growing Entity Classes from Seeds, Luis Sarmento et al., In Proceedings of CIKM 2007, 959-962, Nov. 6-8, 2007, Lisboa, Portugal.

Weakly-supervised discovery of named entities using web search queries, Marius Pasca, In Proceedings of CIKM 2007. Portugal: ACM, 2007: 683-690.

Language-Independent Set Expansion of Named Entities Using the Web, Richard C Wang et al., In Proceedings of ICDM 2007. USA: IEEE Computer Society, 2007: 342-350.

Iterative set expansion of named entities Using the web, Richard C Wang et al., In Proceedings of ICDM 2008. Italy: IEEE Computer Society, 2008: 1091-1096.

Web-Scale Distributional Similarity and Entity Set Expansion, Patrick Pantel et al., In Proceedings of the 2009 Conference on Empirical Methods in Natural Language Processing, 938-947, Singapore, Aug. 6-7, 2009.

Finding Cars, Goddesses and Enzymes Parametrizable Acquisition of Labeled, Benjamin Van Durme et al. In Proceedings of AAAI08. USA: AAAI Press 2008: 1243-1248.

SEISA Set Expansion by Iterative Similarity Aggregation,Yeye He et al., In Proceedings of WWW 2011, 427-436, Mar. 28-Apr. 1, 2011, Hyderabas, India.

Weakly-supervised acquisition of labeled class instances using graph random walks, Partha Pratim Talukdar et al. In Proceedings of the 2008 Conference on Empirical Methods in Natural Language Processing, 582-590, Honolulu, Oct. 2008.

Entity Extraction via Ensemble Semantics, Marco Pennacchiotti et al., in Proceedings of the 2009 Conference on Empirical Methods in Natural Language Processing, 238-247, Singapore, Aug. 6-7, 2009.

Turning Web Text and Search Queries into Factual Knowledge: Hierarchical Class Attribute Extraction, Marius Pasca, In Proceedings of the Twenty-Third AAAI Conference on Artificial Intelligence (2008), 1225-1230.

What You Seek is What You Get: Extraction of Class Attributes from Query Logs. Marius Pasca et al., In Proceedings of IJCAI2007.

* cited by examiner

INFORMATION EXTRACTION APPARATUS AND METHOD

CROSS-REFERENCE TO RELATED APPLICATION

This application is a national stage application under 35 U.S.C. § 371 of International Application No. PCT/CN2017/093321, filed Jul. 18, 2017, which claims priority to Chinese Patent Application No. 201610920441.2, filed Oct. 21, 2016, the contents of which are incorporated by reference in the entirety.

TECHNICAL FIELD

The present invention relates to an information extraction apparatus and an information extraction method.

BACKGROUND

Information extraction has become increasingly important due to a growing amount of data to process, such as information available on the internet and digitized information from various sources. Information extraction is the process of automatically extracting structured information from unstructured or semi-structured data.

SUMMARY

In one aspect, the present invention provides an information extraction method comprising extracting a plurality of candidate entities and a plurality of candidate attributes from a target corpus based on a plurality of entity seeds of one or more target types in an entity seeds set; establishing a plurality of correlations between the plurality of candidate attributes and a plurality of entities comprising the plurality of candidate entities and the plurality of entity seeds; and selecting one or more target entities from the plurality of entities and one or more target attributes from the plurality of candidate attributes based on the plurality of correlations.

Optionally, selecting the one or more target entities from the plurality of entities and the one or more target attributes from the plurality of candidate attributes comprises obtaining a ranking of the plurality of entities and a ranking of the plurality of candidate attributes based on a plurality of correlation coefficients of the plurality of correlations; selecting the one or more target entities from the plurality of entities based on the ranking of the plurality of entities; and selecting the one or more target attributes from the plurality of candidate attributes based on the ranking of the plurality of candidate attributes.

Optionally, establishing the plurality of correlations comprises generating an entity-attribute graph representing the plurality of correlations, each of which being a correlation between one the plurality of entities and one of the plurality of candidate attributes; the entity-attribute graph comprises a plurality of nodes and a plurality of edges, each of the plurality of nodes representing one of the plurality of entities or one of the plurality of candidate attributes, each of the plurality of edges representing one of the plurality of correlations; each of the plurality of edges is associated with a weight representing one of the plurality of correlation coefficients; wherein establishing the plurality of correlations further comprises generating an edge between nodes of one of the plurality of entities and one of the plurality of candidate attributes, thereby obtaining the plurality of edges; calculating a correlation coefficient corresponding to one of the plurality of edges; and assigning the correlation coefficient of the one of the plurality of edges as the weight for the one of the plurality of edges.

Optionally, obtaining the ranking of the plurality of entities and the ranking of the plurality of candidate attributes comprises calculating a score for each of the plurality of entities based on the entity-attribute graph, a score for each of the plurality of candidate attributes calculated at time t, and a score coefficient for each of the plurality of entities derived from one or more of the plurality of correlation coefficients; calculating a score for each of the plurality of candidate attributes based on the entity-attribute graph, a score for each of the plurality of entities calculated at time t, and a score coefficient for each of the plurality of candidate attributes derived from one or more of the plurality of correlation coefficients; and reiterating calculating the score for each of the plurality of entities and the score for each of the plurality of candidate attributes for a number of times.

Optionally, obtaining the ranking of the plurality of entities and the ranking of the plurality of candidate attributes comprises calculating the score for each of the plurality of entities based on Equation (1):

$$S_{t+1}(e_i) = \sum_j S_t(a_j) \times \frac{w_{i,j}}{\sum_k w_{k,j}}; \qquad (1)$$

calculating the score for each of the plurality of candidate attributes based on Equation (2):

$$S_{t+1}(a_j) = \sum_i S_t(e_i) \times \frac{w_{i,j}}{\sum_k w_{i,p}}; \qquad (2)$$

wherein $S_{t+1}(e_i)$ stands for a score for an entity $e_i$ of the plurality of entities calculated at time (t+1), $S_t(a_j)$ stands for a score for an candidate attribute $a_j$ of the plurality of candidate attributes calculated at time t, $$\frac{w_{i,j}}{\sum_k w_{k,j}}$$

stands for the score coefficient for the plurality of entities, $w_{i,j}$ stands for a weight for an edge between a node corresponding to the entity $e_i$ and a node corresponding to the candidate attribute $a_j$, $w_{k,j}$ stands for a weight for an edge between a node corresponding to the entity $e_k$ and a node corresponding to the candidate attribute $a_j$, j stands for a number of edges connected to the node corresponding to the entity $e_i$ in the entity-attribute graph, and k stands for a number of edges connected to the node corresponding to the candidate attribute $a_j$ in the entity-attribute graph, $S_{t+1}(a_j)$ stands for a score for the candidate attribute $a_j$ of the plurality of candidate attributes calculated at time (t+1), $S_t(e_i)$ stands for a score for the entity $e_i$ of the plurality of entities calculated at time t, $$\frac{w_{i,j}}{\sum_k w_{i,p}}$$

stands for the score coefficient for the plurality of candidate attributes, $w_{i,p}$ stands for a weight for an edge between the node corresponding to the entity $e_i$ and a node corresponding to the candidate attribute $a_p$, i stands for the number of edges connected to the node corresponding to the candidate attribute $a_j$ in the entity-attribute graph, and p stands for the number of edges connected to the node corresponding to the entity $e_i$ in the entity-attribute graph.

Optionally, reiterating calculating the score for each of the plurality of entities and the score for each of the plurality of candidate attributes comprises reiterating calculating the score for each of the plurality of entities and the score for each of the plurality of candidate attributes until the score for each of the plurality of entities converges, and the score for each of the plurality of candidate attributes converges.

Optionally, selecting the one or more target entities from the plurality of entities and the one or more target attributes from the plurality of candidate attributes comprises obtaining a final score for each of the plurality of entities and a final score for each of the plurality of candidate attributes after calculating the score for each of the plurality of entities and the score for each of the plurality of candidate attributes is reiterated for the number of times; and obtaining the ranking of the plurality of entities and the ranking of the plurality of candidate attributes comprises ranking the plurality of entities based on the final score for each of the plurality of entities and rank the plurality of candidate attributes based on the final score for each of the plurality of candidate attributes.

Optionally, extracting the plurality of candidate entities and the plurality of candidate attributes from a target corpus comprises extracting an entity extraction template from the target corpus based on each of the plurality of entity seeds in the entity seeds set, thereby obtaining a plurality of entity extraction templates; extracting a candidate entity from the target corpus based on each of the plurality of entity extraction templates, thereby obtaining the plurality of candidate entities; and extracting a candidate attribute from the target corpus based on each of the plurality of candidate entities and an attribute extraction template, thereby obtaining the plurality of candidate attributes.

Optionally, extracting the entity extraction template from the target corpus comprises searching from the target corpus a first character string relevant to one of the plurality of entity seeds, the first character string comprising one of the plurality of entity seeds and one or more attributes thereof, and limited by a first character string length, thereby obtaining a plurality of first character strings respectively relevant to the plurality of entity seeds; and determining the entity extraction template for each of the plurality of entity seeds based on the first character string, thereby obtaining the plurality of entity extraction templates respectively for the plurality of first character strings, each of the plurality of entity extraction templates comprising a common entity symbol and the one or more attributes of one of the plurality of entity seeds.

Optionally, extracting the candidate entity from the target corpus comprises searching from the target corpus a second character string relevant to the entity extraction template, the second character string comprising a candidate entity and the one or more attributes of one of the plurality of entity seeds, and limited by a second character string length, thereby obtaining a plurality of second character strings respectively relevant to the plurality of entity extraction templates; and obtaining the plurality of candidate entities by extracting the candidate entity from each of the plurality of second character strings.

Optionally, extracting the candidate attribute from the target corpus comprises searching from the target corpus a third character string relevant to the candidate entity and the attribute extraction template based on the candidate entity, the third character string comprising the candidate entity and one or more attributes of the candidate entity, and limited by a third character string length, thereby obtaining a plurality of third character strings respectively relevant to the plurality of candidate entities; and obtaining the plurality of candidate attributes by extracting the one or more attributes of the candidate entity from each of the plurality of third character strings.

Optionally, the target corpus comprises one or more unstructured medical texts; and the plurality of entity seeds are a plurality of medical entities.

Optionally, calculating the correlation coefficient corresponding to the one of the plurality of edges comprises calculating the correlation coefficient corresponding to one of the plurality of edges based on a context in the target corpus of one of the plurality of entities and one of the plurality of candidate attributes represented by nodes connected to the one of the plurality of edges.

Optionally, calculating the correlation coefficient corresponding to the one of the plurality of edges comprises mapping one of the plurality of entities and one of the plurality of candidate attributes represented by nodes connected to the one of the plurality of edges to a semantic space using a neural network; and calculating the correlation coefficient corresponding to the one of the plurality of edges in the semantic space.

Optionally, calculating the correlation coefficient corresponding to the one of the plurality of edges comprises mapping one of the plurality of entities and one of the plurality of candidate attributes represented by nodes connected to the one of the plurality of edges to a concept space; and calculating the correlation coefficient corresponding to the one of the plurality of edges in the concept space.

In another aspect, the present invention provides an information extraction apparatus comprising an extractor configured to extract a plurality of candidate entities and a plurality of candidate attributes from a target corpus based on a plurality of entity seeds of one or more target types in an entity seeds set; a correlator configured to establish a plurality of correlations between the plurality of candidate attributes and a plurality of entities comprising the plurality of candidate entities and the plurality of entity seeds; and a target selector configured to select one or more target entities from the plurality of entities and one or more target attributes from the plurality of candidate attributes based on the plurality of correlations.

Optionally, the target selector comprises a correlation ranker configured to obtain a ranking of the plurality of entities and a ranking of the plurality of candidate attributes based on a plurality of correlation coefficients of the plurality of correlations; a target entity selector configured to select the one or more target entities from the plurality of entities based on the ranking of the plurality of entities; and a target attribute selector configured to select the one or more target attributes from the plurality of candidate attributes based on the ranking of the plurality of candidate attributes.

Optionally, the correlator configured to generate an entity-attribute graph representing the plurality of correlations, each of which being a correlation between one the plurality of entities and one of the plurality of candidate attributes; the entity-attribute graph comprises a plurality of nodes and a plurality of edges, each of the plurality of nodes representing one of the plurality of entities or one of the plurality of candidate attributes, each of the plurality of edges representing one of the plurality of correlations; each of the plurality of edges is associated with a weight representing one of the plurality of correlation coefficients; the correlator comprises an edge generator configured to generate an edge between nodes of one of the plurality of entities and one of the plurality of candidate attributes, thereby obtaining the plurality of edges; a coefficient calculator configured to calculate a correlation coefficient corresponding to one of the plurality of edges; and a weight assignor configured to assign the correlation coefficient of the one of the plurality of edges as the weight for the one of the plurality of edges.

Optionally, the correlation ranker is configured to calculate a score for each of the plurality of entities based on the entity-attribute graph, a score for each of the plurality of candidate attributes calculated at time 1, and a score coefficient for each of the plurality of entities derived from one or more of the plurality of correlation coefficients; calculate a score for each of the plurality of candidate attributes based on the entity-attribute graph, a score for each of the plurality of entities calculated at time t, and a score coefficient for each of the plurality of candidate attributes derived from one or more of the plurality of correlation coefficients; and reiterate calculating the score for each of the plurality of entities and the score for each of the plurality of candidate attributes for a number of times.

Optionally, the correlation ranker is configured to calculate the score for each of the plurality of entities based on Equation (1):

$$S_{t+1}(e_i) = \sum_j S_t(a_j) \times \frac{w_{i,j}}{\sum_k w_{k,j}}; \quad (1)$$

and calculate the score for each of the plurality of candidate attributes based on Equation (2):

$$S_{t+1}(a_j) = \sum_i S_t(e_i) \times \frac{w_{i,j}}{\sum_k w_{i,p}}; \quad (2)$$

wherein $S_{t+1}(e_i)$ stands for a score for an entity $e_i$ of the plurality of entities calculated at time (t+1), $S_t(a_j)$ stands for a score for an candidate attribute $a_j$ of the plurality of candidate attributes calculated at time t, $$\frac{w_{i,j}}{\sum_k w_{k,j}}$$

k stands for the score coefficient for the plurality of entities, $w_{i,j}$ stands for a weight for an edge between a node corresponding to the entity $e_i$ and a node corresponding to the candidate attribute $a_j$, $w_{k,j}$ stands for a weight for an edge between a node corresponding to the entity $e_k$ and a node corresponding to the candidate attribute $a_j$, j stands for a number of edges connected to the node corresponding to the entity $e_i$ in the entity-attribute graph, and k stands for a number of edges connected to the node corresponding to the candidate attribute $a_j$ in the entity-attribute graph; $S_{t+1}(a_j)$ stands for a score for the candidate attribute $a_j$ of the plurality of candidate attributes calculated at time (t+1), $S_t(e_i)$ stands for a score for the entity $e_i$ of the plurality of entities calculated at time t, $$\frac{w_{i,j}}{\sum_k w_{i,p}}$$

stands for the score coefficient for the plurality of candidate attributes, $w_{i,p}$ stands for a weight for an edge between the node corresponding to the entity $e_i$ and a node corresponding to the candidate attribute $a_p$, i stands for the number of edges connected to the node corresponding to the candidate attribute $a_j$ in the entity-attribute graph, and p stands for the number of edges connected to the node corresponding to the entity $e_i$ in the entity-attribute graph.

Optionally, the correlation ranker is configured to reiterate calculating the score for each of the plurality of entities and the score for each of the plurality of candidate attributes until the score for each of the plurality of entities converges, and the score for each of the plurality of candidate attributes converges.

Optionally, the target entity selector is configured to obtain a final score for each of the plurality of entities and the target attribute selector is configured to obtain a final score for each of the plurality of candidate attributes after calculating the score for each of the plurality of entities and the score for each of the plurality of candidate attributes is reiterated for the number of times; the correlation ranker is configured to rank the plurality of entities based on the final score for each of the plurality of entities and rank the plurality of candidate attributes based on the final score for each of the plurality of candidate attributes.

Optionally, the extractor comprises a first sub-extractor configured to extract an entity extraction template from the target corpus based on each of the plurality of entity seeds in the entity seeds set, thereby obtaining a plurality of entity extraction templates; a second sub-extractor configured to extract a candidate entity from the target corpus based on each of the plurality of entity extraction templates, thereby obtaining the plurality of candidate entities; and a third sub-extractor configured to extract a candidate attribute from the target corpus based on each of the plurality of plurality of candidate entities and an attribute extraction template, thereby obtaining the plurality of candidate attributes.

Optionally, the first sub-extractor is configured to search from the target corpus a first character string relevant to one of the plurality of entity seeds, the first character string comprising one of the plurality of entity seeds and one or more attributes thereof, and limited by a first character string length, thereby obtaining a plurality of first character strings respectively relevant to the plurality of entity seeds; and determine the entity extraction template for each of the plurality of entity seeds based on the first character string, thereby obtaining the plurality of entity extraction templates respectively for the plurality of first character strings, each of the plurality of entity extraction templates comprising a common entity symbol and the one or more attributes of one of the plurality of entity seeds.

Optionally, the second sub-extractor is configured to search from the target corpus a second character string relevant to the entity extraction template, the second character string comprising a candidate entity and the one or more attributes of one of the plurality of entity seeds, and limited by a second character string length, thereby obtaining a plurality of second character strings respectively relevant to the plurality of entity extraction templates; and obtain the plurality of candidate entities by extracting the candidate entity from each of the plurality of second character strings.

Optionally, the third sub-extractor is configured to search from the target corpus a third character string relevant to the candidate entity and the attribute extraction template based on the candidate entity, the third character string comprising the candidate entity and one or more attributes of the candidate entity, and limited by a third character string length, thereby obtaining a plurality of third character strings respectively relevant to the plurality of candidate entities; and obtain the plurality of candidate attributes by extracting the one or more attributes of the candidate entity from each of the plurality of third character strings.

Optionally, the target corpus comprises one or more unstructured medical texts; and the plurality of entity seeds are a plurality of medical entities.

Optionally, the coefficient calculator is configured to calculate the correlation coefficient corresponding to one of the plurality of edges based on a context in the target corpus of one of the plurality of entities and one of the plurality of candidate attributes represented by nodes connected to the one of the plurality of edges.

Optionally, the coefficient calculator is configured to calculate the correlation coefficient corresponding to one of the plurality of edges by mapping one of the plurality of entities and one of the plurality of candidate attributes represented by nodes connected to the one of the plurality of edges to a semantic space using a neural network; and calculating the correlation coefficient corresponding to the one of the plurality of edges in the semantic space.

Optionally, the coefficient calculator is configured to calculate the correlation coefficient corresponding to one of the plurality of edges by mapping one of the plurality of entities and one of the plurality of candidate attributes represented by nodes connected to the one of the plurality of edges to a concept space; and calculating the correlation coefficient corresponding to the one of the plurality of edges in the concept space.

In another aspect, the present invention provides a non-transitory computer-readable storage medium storing computer-readable instructions, the computer-readable instructions being executable by a processor to cause the processor to perform extracting a plurality of candidate entities and a plurality of candidate attributes from a target corpus based on a plurality of entity seeds of one or more target types in an entity seeds set; establishing a plurality of correlations between the plurality of candidate attributes and a plurality of entities comprising the plurality of candidate entities and the plurality of entity seeds; and selecting one or more target entities from the plurality of entities and one or more target attributes from the plurality of candidate attributes based on the plurality of correlations.

BRIEF DESCRIPTION OF THE FIGURES

The following drawings are merely examples for illustrative purposes according to various disclosed embodiments and are not intended to limit the scope of the present invention.

FIG. 2-1 is a flow chart illustrating an information extraction method in some embodiments according to the present disclosure.

FIG. 2-2 is a flow chart illustrating a method of extracting a plurality of candidate entities and a plurality of candidate attributes from a target corpus based on a plurality of entity seeds in an entity seeds set in some embodiments according to the present disclosure.

FIG. 2-3 is a flow chart illustrating a method of extracting an entity extraction template from the target corpus based on the plurality of entity seeds in the entity seeds set in some embodiments according to the present disclosure.

FIG. 2-4 is a flow chart illustrating a method of extracting a candidate entity from the target corpus based on the plurality of entity extraction templates in some embodiments according to the present disclosure.

FIG. 2-5 is a flow chart illustrating a method of extracting a candidate attribute from the target corpus based on the plurality of candidate entities and an attribute extraction template in some embodiments according to the present disclosure.

FIG. 2-6 is a flow chart illustrating a method of establishing a plurality of correlations between the plurality of candidate attribute and a plurality of entities in some embodiments according to the present disclosure.

FIG. 2-7 shows an exemplary entity-attribute graph in some embodiments according to the present disclosure.

FIG. 2-8 shows an exemplary entity-attribute table in some embodiments according to the present disclosure.

FIG. 2-9 is a flow chart illustrating a method of selecting a target entity from the plurality of entities and a target attribute from the plurality of candidate attributes in some embodiments according to the present disclosure.

FIG. 2-10 is a flow chart illustrating a method of obtaining a ranking of the plurality of entities and a ranking of the plurality of candidate attributes in some embodiments according to the present disclosure.

FIG. 2-11 is a flow chart illustrating a method of selecting a target entity from the plurality of entities based on a ranking of the plurality of entities in some embodiments according to the present disclosure.

FIG. 2-12 is a flow chart illustrating a method of selecting a target attribute from the plurality of candidate attributes based on a ranking of the plurality of candidate attributes in some embodiments according to the present disclosure.

FIG. 2-13 is a flow chart illustrating a method of establishing a structured text based on the target entities and the target attributes in some embodiments according to the present disclosure.

FIG. 2-14 is a flow chart illustrate an exemplary information extraction method in some embodiments according to the present disclosure.

FIG. 3-1 is a schematic diagram illustrating the structure of an information extraction apparatus in some embodiments according to the present disclosure.

FIG. 3-2 is a schematic diagram illustrating the structure of a target selector in some embodiments according to the present disclosure.

FIG. 3-3 is a schematic diagram illustrating the structure of a correlator in some embodiments according to the present disclosure.

FIG. 3-4 is a schematic diagram illustrating the structure of an extractor in some embodiments according to the present disclosure.

FIG. 3-5 is a schematic diagram illustrating the structure of an information extraction apparatus in some embodiments according to the present disclosure.

DETAILED DESCRIPTION

Figure 1:
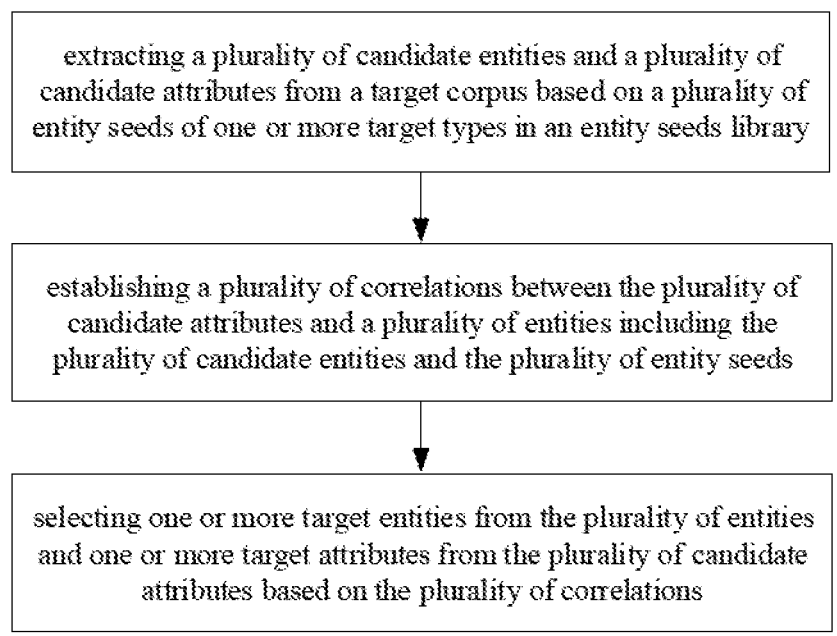
FIG. 1 is a flow chart illustrating an information extraction method in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

With the rapid spread of digitized medical records and the availability of big data technology in healthcare, a huge amount of medical information is stored as unstructured texts or semi-structured texts. Using natural language processing technology, these unstructured and semi-structured medical texts can be converted into structured texts to reveal important medical information in these texts. A critical step involved in the conversion process is the extraction of entities and attributes of certain types. As used herein, the term unstructured text generally refers to texts that do not have a pre-defined data model or have not been organized in a pre-defined manner. For example, the unstructured texts may be texts that have not been categorized or organized based on predetermined categories and formats, e.g., texts in a narrative format. Examples of unstructured texts includes Hyper Text Markup Language (HTML) texts, Extensible Markup Language (XML) texts, emails, word documents, and so on. As used herein, the term structured text generally refers to texts that have been categorized or organized based on predetermined categories and formats. Examples of structured texts include texts organized in a relational database. An entity can be a real-world object that can be easily identifiable. An entity may be a tangible object or an intangible object. An entity may be represented by means of attributes.

In conventional information extraction methods, entity extraction and attribute extraction are treated as two separate and distinct tasks performed in two separate stages. Based on separately extracted entities and attributes, the unstructured texts are converted into structured texts. First, the conventional methods involve extracting candidate entities from a target corpus based on entity seeds in an entity seed set of a certain target type, calculating similarity between the candidate entities and the entity seeds, and selecting target entities having a similarity greater than a pre-set similarity. Second, the conventional methods include extracting candidate attributes from the target corpus based on attribute seeds in an attribute seed set (corresponding to the entity seed set), calculating similarity between the candidate attributes and the attribute seeds based on a context of the candidate attributes in the target corpus, and selecting target attributes having a similarity greater than a pre-set similarity. Third, the conventional methods further include storing the target entities in a target entity set, and storing target attributes in a target attribute set, thereby obtaining a structured text. Because the entity extraction and the attribute extraction are performed separately in the conventional methods, the information extraction process is associated with a semantic drifting issue, e.g., candidate entities of an irrelevant different type are extracted and included in the target entity set.

Accordingly, the present disclosure provides, inter alia, an information extraction apparatus and method that substantially obviate one or more of the problems due to limitations and disadvantages of the related art. In one aspect, the present disclosure provides an information extraction apparatus. In some embodiments, the information extraction apparatus includes an extractor configured to extract a plurality of candidate entities and a plurality of candidate attributes from a target corpus based on a plurality of entity seeds of one or more target types in an entity seeds set; a correlator configured to establish a plurality of correlations between the plurality of candidate attributes and a plurality of entities including the plurality of candidate entities and the plurality of entity seeds, and a target selector configured to select one or more target entities from the plurality of entities and one or more target attributes from the plurality of candidate attributes based on the plurality of correlations.

As used herein, the term "entity" refers to a category of things or objects which are each recognized as being capable of an independent existence and which can be uniquely identified. For example, in the medical field, non-limiting examples of an entity include diseases such as acute bronchitis, bronchial asthma, and arrhythmia. In the political field, non-limiting examples of an entity include countries such as China, United States, and Russia. As used herein, the term "attribute" refers to a characteristic that can be obtained about an entity. For example, in the medical field, non-limiting examples of an attribute include coughing, wheezing, and angina pectoris. In the political field, non-limiting examples of an attribute include capital city, leader, and national flag. Optionally, attributes have attribute values. As used herein, the term "attribute value" refers to textual, numeric, date, or other parameters associated with a given attribute. For example, the attribute values corresponding to an attribute "capital city" may be Beijing, Washington D.C., and Moscow. In the context of the present disclosure, the term "attribute extraction" or "extraction of attribute" broadly refers to extraction of attributes or attribute values. Optionally, the term "attribute extraction" refers to extraction of one or more attributes. Optionally, the term "attribute extraction" refers to extraction of one or more attribute values. Optionally, the term "attribute extraction" refers to extraction of a pair of attribute and one or more attribute values.

In another aspect, the present disclosure provides an information extraction method. FIG. 1 is a flow chart illustrating an information extraction method in some embodiments according to the present disclosure. Referring to FIG. 1, the method in some embodiments includes extracting a plurality of candidate entities and a plurality of candidate attributes from a target corpus based on a plurality of entity seeds of one or more target types in an entity seeds set; establishing a plurality of correlations between the plurality of candidate attributes and a plurality of entities including the plurality of candidate entities and the plurality of entity seeds, and selecting one or more target entities from the plurality of entities and one or more target attributes from the plurality of candidate attributes based on the plurality of correlations. In the present method, the target entities and the target attributes are selected based on the correlations between the plurality of candidate attributes and a plurality of entities, obviating the semantic drifting issue in the conventional information extraction method.

Figures 1, 2:
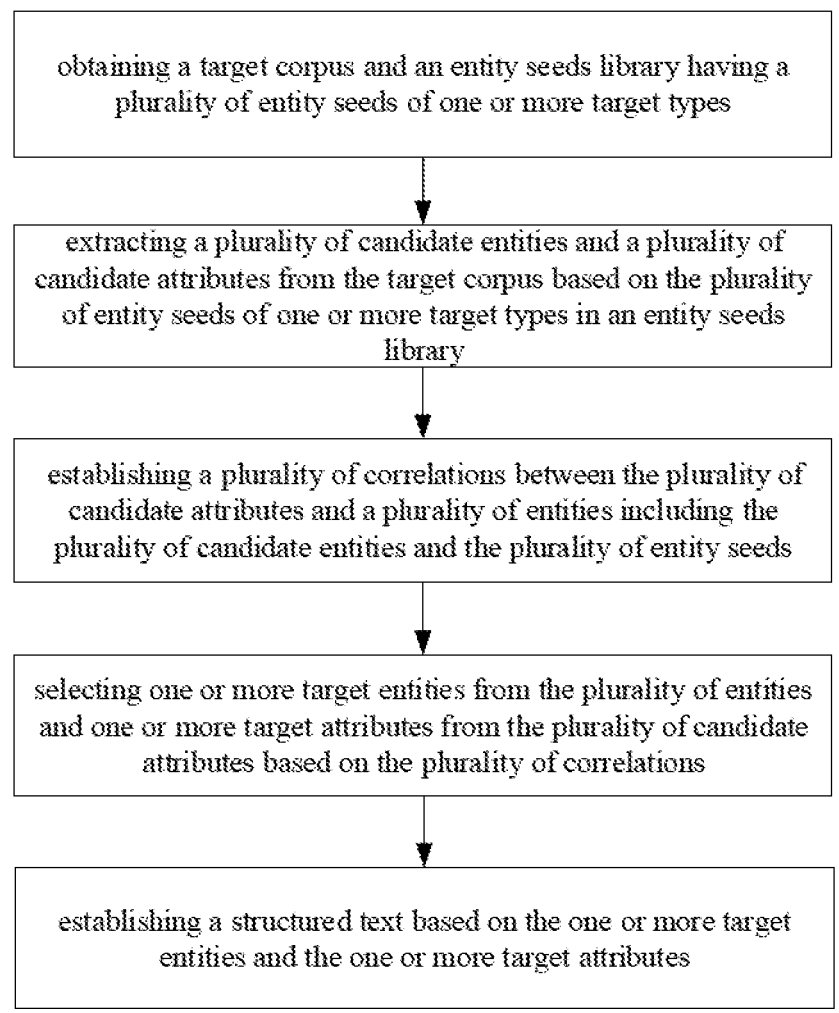
Figure 2:
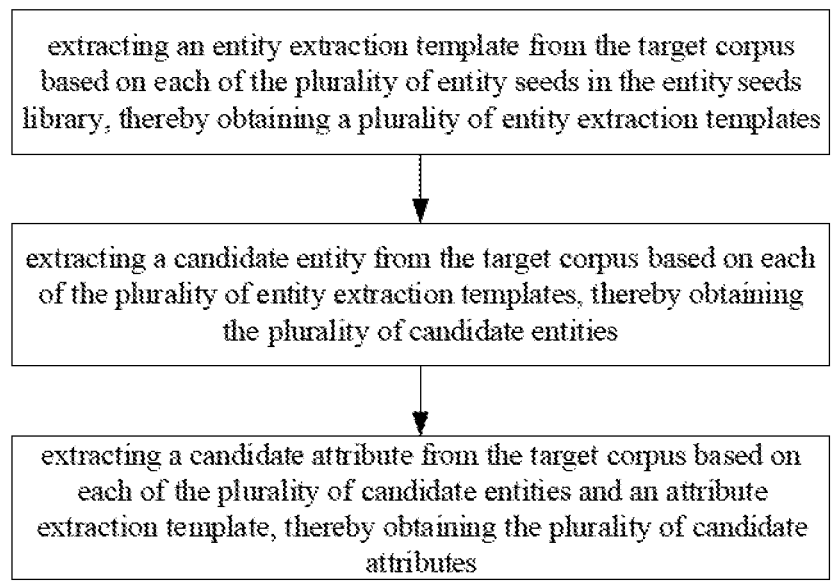

FIG. 2-1 is a flow chart illustrating an information extraction method in some embodiments according to the present disclosure. Referring to FIG. 2-1, the method includes obtaining a target corpus and an entity seeds set having a plurality of entity seeds of one or more target types; extracting a plurality of candidate entities and a plurality of candidate attributes from the target corpus based on the plurality of entity seeds of one or more target types in an entity seeds set; establishing a plurality of correlations between the plurality of candidate attributes and a plurality of entities including the plurality of candidate entities and the plurality of entity seeds; selecting one or more target entities from the plurality of entities and one or more target attributes from the plurality of candidate attributes based on the plurality of correlations; and establishing a structured text based on the one or more target entities and the one or more target attributes.

Optionally, the target corpus includes various unstructured texts. Examples of unstructured texts include texts in HTML format, texts in XML format, and so on. The entity seeds set includes a plurality of entity seeds of one or more target types, e.g., 3 to 5 entity seeds of one or more target types.

In some embodiments, the method includes obtaining a target corpus M and an entity seeds set Es. Optionally, Es includes a plurality of entity seeds Es1, Es2, Es3, and so on of one or more target types. In one example, the target corpus M is a target corpus in the political domain, and includes one or more unstructured political texts. For example, the target type may be "countries", and the entity seeds set Es may be Es={China, United States, Russia, . . . }. Each of the entity seeds, China, United States, Russia, is an entity seed of a target type "countries". In another example, the target corpus M is a target corpus in the medical domain, and includes one or more unstructured medical texts such as medical literature and digitized medical record. The target type may be "respiratory diseases," and the entity seeds set Es may be Es={acute bronchitis . . . }. The entity seed, acute bronchitis, is an entity seed of a target type "respiratory diseases." The entity seed is a medical entity.

Optionally, the method further includes inputting a target corpus M and an entity seeds set Es. An information extraction apparatus for implementing the present information extraction method may include a user input interface allowing a user input the target corpus M and the entity seeds set Es. The information extraction apparatus is configured to receive the inputted target corpus M and the entity seeds set Es, thereby obtaining the target corpus M and the entity seeds set Es. Examples of user input interfaces include, but are not limited to, a keyboard, a scanner, etc. Optionally, the information extraction apparatus stores the target corpus M and the entity seeds set Es. Based on the user instruction, the information extraction apparatus is configured to read the stored target corpus M and the stored entity seeds set Es, thereby obtaining the target corpus M and the entity seeds set Es.

Subsequent to obtaining the target corpus and the entity seeds set having a plurality of entity seeds of one or more target types, the method further includes extracting a plurality of candidate entities and a plurality of candidate attributes from the target corpus based on the plurality of entity seeds of one or more target types in an entity seeds set. In one example, the information extraction apparatus is configured to extract a plurality of candidate entities and a plurality of candidate attributes from a target corpus M based on the plurality of entity seeds, e.g., Es1, Es2, Es3, etc.

FIG. 2-2 is a flow chart illustrating a method of extracting a plurality of candidate entities and a plurality of candidate attributes from a target corpus based on a plurality of entity seeds in an entity seeds set in some embodiments according to the present disclosure. Referring to FIG. 2-2, the step of extracting the plurality of candidate entities and the plurality of candidate attributes from the target corpus in some embodiments includes extracting an entity extraction template from the target corpus based on each of the plurality of entity seeds in the entity seeds set, thereby obtaining a plurality of entity extraction templates; extracting a candidate entity from the target corpus based on each of the plurality of entity extraction templates, thereby obtaining the plurality of candidate entities; and extracting a candidate attribute from the target corpus based on each of the plurality of candidate entities and an attribute extraction template, thereby obtaining the plurality of candidate attributes.

Figures 2, 3:
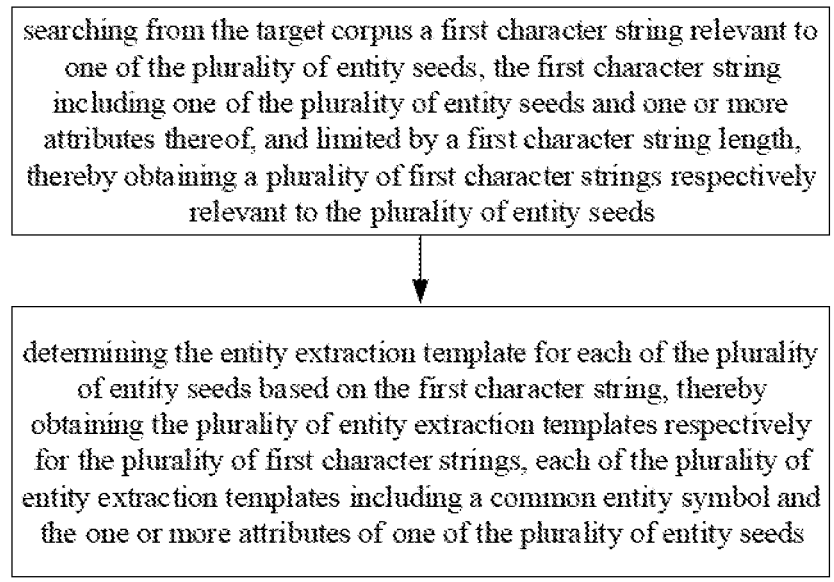

In some embodiments, the information extraction apparatus is configured to extract an entity extraction template from the target corpus based on each of the plurality of entity seeds in the entity seeds set, thereby obtaining a plurality of entity extraction templates. In one example, the information extraction apparatus is configured to extract a plurality of entity extraction templates from the target corpus M based on each of entity seeds Es1, Es2, Es3, etc. FIG. 2-3 is a flow chart illustrating a method of extracting an entity extraction template from the target corpus based on the plurality of entity seeds in the entity seeds set in some embodiments according to the present disclosure. Referring to FIG. 2-3, the step of extracting an entity extraction template from the target corpus based on the plurality of entity seeds in the entity seeds set in some embodiments includes searching from the target corpus a first character string relevant to one of the plurality of entity seeds, the first character string including one of the plurality of entity seeds and one or more attributes thereof and limited by a first character string length, thereby obtaining a plurality of first character strings respectively relevant to the plurality of entity seeds; and determining the entity extraction template for each of the plurality of entity seeds based on the first character string, thereby obtaining the plurality of entity extraction templates respectively for the plurality of first character strings, each of the plurality of entity extraction templates including a common entity symbol and the one or more attributes of one of the plurality of entity seeds.

In some embodiments, the information extraction apparatus is configured to search from the target corpus a first character string relevant to one of the plurality of entity seeds, the first character string including one of the plurality of entity seeds and one or more attributes thereof; and limited by a first character string length, thereby obtaining a plurality of first character strings respectively relevant to the plurality of entity seeds. Any appropriate character string length may be used in the searching step. Optionally, the first character string length is a length of approximately 100 characters.

Optionally, the information extraction apparatus is configured to search from the target corpus M a first character string relevant to each of the plurality of entity seeds Es1, Es2, Es3, etc., the first character string including one of the plurality of entity seeds (e.g., Es1, Es2, Es3, etc.) and one or more attributes thereof, and limited by a first character string length. In one example, the first character string relevant to the entity seed Es1 includes the entity seed Es1 and one or more attributes of the entity seed Es1.

In one example, the target corpus M includes one or more unstructured medical texts, and the entity seed is "acute bronchitis." Based on the entity seed "acute bronchitis," the information extraction apparatus is configured to search from the target corpus M a first character string relevant to the entity seed "acute bronchitis." For example, the first character string may be "acute bronchitis causes coughing, chest pain, and difficulty in breathing." The first character string includes the entity seed "acute bronchitis," and a plurality of attributes of the entity seed "acute bronchitis" such as "coughing," "chest pain," and "difficulty in breathing."

In some embodiments, subsequent to obtaining the plurality of first character strings, the information extraction apparatus is further configured to determine the entity extraction template for each of the plurality of entity seeds based on the first character string, thereby obtaining the plurality of entity extraction templates respectively for the plurality of first character strings. Optionally, each of the plurality of entity extraction templates includes a common entity symbol and the one or more attributes of one of the plurality of entity seeds. Optionally, the information extraction apparatus is configured to determine a plurality of entity extraction templates for each entity seed. Optionally, the common entity symbol is a symbol "*".

Optionally, the information extraction apparatus is configured to replace the entity seed in the first character string with a common entity symbol (e.g., the symbol *), thereby obtaining the entity extraction template. In one example, the information extraction apparatus is configured to determine a single entity extraction template for each entity seed, the information extraction apparatus is configured to replace the entity seed Es1 in a first character string relevant to the entity seed Es1 with a symbol "*" to obtain an entity extraction template B1 corresponding to the entity seed Es1; replace the entity seed Es2 in a first character string relevant to the entity seed Es2 with a symbol "*" to obtain an entity extraction template B2 corresponding to the entity seed Es2; replace the entity seed Es3 in a first character string relevant to the entity seed Es3 with a symbol "*" to obtain an entity extraction template B3 corresponding to the entity seed Es3; and so on. The entity extraction template B1 includes a common entity symbol "*" and one or more attributes of the entity seed Es1. The entity extraction template B2 includes a common entity symbol "*" and one or more attributes of the entity seed Es2. The entity extraction template B3 includes a common entity symbol "*" and one or more attributes of the entity seed Es3.

In one example, the entity seed is "acute bronchitis." The information extraction apparatus is configured to replace the entity seed "acute bronchitis" in the first character string "acute bronchitis causes coughing, chest pain, and difficulty in breathing" with a common entity symbol (e.g., the symbol *), thereby obtaining the entity extraction template corresponding to the entity seed "acute bronchitis." For example, the entity extraction template may be "*causes coughing, chest pain, and difficulty in breathing."

Figures 2, 3, 4:
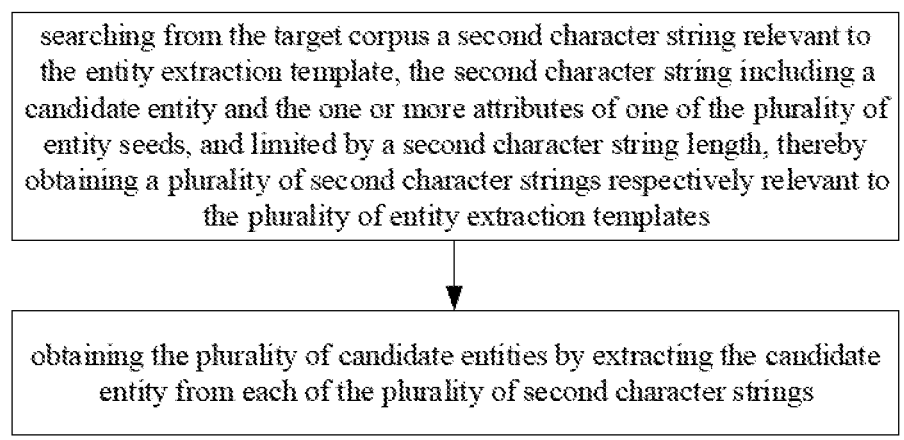

In some embodiments, subsequent to obtaining the plurality of entity extraction templates, the information extraction apparatus is further configured to extract a candidate entity from the target corpus based on each of the plurality of entity extraction templates, thereby obtaining the plurality of candidate entities. In one example, the information extraction apparatus is configured to extract a candidate entity from the target corpus M based on each of the entity extraction templates B1, B2, and B3, etc. FIG. 2-4 is a flow chart illustrating a method of extracting a candidate entity from the target corpus based on the plurality of entity extraction templates in some embodiments according to the present disclosure. Referring to FIG. 2-4, the step of extracting the candidate entity from the target corpus in some embodiments includes searching from the target corpus a second character string relevant to the entity extraction template, the second character string including a candidate entity and the one or more attributes of one of the plurality of entity seeds, and limited by a second character string length, thereby obtaining a plurality of second character strings respectively relevant to the plurality of entity extraction templates; and obtaining the plurality of candidate entities by extracting the candidate entity from each of the plurality of second character strings.

In some embodiments, the information extraction apparatus is configured to search from the target corpus a second character string relevant to the entity extraction template, the second character string including a candidate entity and the one or more attributes of one of the plurality of entity seeds, and limited by a second character string length, thereby obtaining a plurality of second character strings respectively relevant to the plurality of entity extraction templates. Optionally, the information extraction apparatus is configured to determine a plurality of second character strings for each entity extraction template. Any appropriate character string length may be used in the searching step. Optionally, the second character string length is substantially the same as the first character string length. Optionally, the second character string length is different from the first character string length.

Optionally, the information extraction apparatus is configured to search from the target corpus M a plurality of second character strings respectively relevant to the plurality of entity extraction templates, e.g., the entity extraction template B1, the entity extraction template B2, the entity extraction template B3, etc. The second character string includes a candidate entity and the one or more attributes of one of the plurality of entity seeds. For example, a second character string relevant to the entity extraction template B1 includes a candidate entity and the one or more attributes of the entity seed Es1 corresponding to the entity extraction template B1. The second character string is limited by a second character string length.

In one example, the target corpus M includes one or more unstructured medical texts, and the entity extraction template is "*causes coughing, chest pain, and difficulty in breathing." Based on the entity extraction template being "*causes coughing, chest pain, and difficulty in breathing," the information extraction apparatus is configured to search from the target corpus M a second character string relevant to the entity extraction template "*causes coughing, chest pain, and difficulty in breathing." For example, the second character string may be "bronchial asthma causes coughing, chest pain, and difficulty in breathing." The second character string includes the candidate entity "bronchial asthma," and a plurality of attributes of the entity seed "acute bronchitis" corresponding to the entity extraction template "*causes coughing, chest pain, and difficulty in breathing." For example, the second character string includes attributes such as "coughing." "chest pain," and "difficulty in breathing."

In some embodiments, subsequent to obtaining the plurality of second character strings, the information extraction apparatus is further configured to obtain the plurality of candidate entities by extracting the candidate entity from each of the plurality of second character strings.

In some embodiments, the information extraction apparatus is configured to compare the second character string with the corresponding entity extraction template; determine characters in the second character string corresponding to the common entity symbol in the corresponding entity extraction template; and use the characters in the second character string corresponding to the common entity symbol in the corresponding entity extraction template as the candidate entity, thereby extracting the candidate entity from the second character string. In one example, the information extraction apparatus is configured to compare a second character string corresponding to the entity extraction template B1 with the entity extraction template B1, determine characters in the second character string corresponding to the common entity symbol in the entity extraction template B1, and use the characters in the second character string corresponding to the common entity symbol in the entity extraction template B1 as the candidate entity, thereby extracting a candidate entity Ec1 from the second character string. In another example, the information extraction apparatus is configured to compare a second character string corresponding to the entity extraction template B2 with the entity extraction template B2, determine characters in the second character string corresponding to the common entity symbol in the entity extraction template B2, and use the characters in the second character string corresponding to the common entity symbol in the entity extraction template B2 as the candidate entity, thereby extracting a candidate entity Ec2 from the second character string. In another example, the information extraction apparatus is configured to compare a second character string corresponding to the entity extraction template B3 with the entity extraction template B3, determine characters in the second character string corresponding to the common entity symbol in the entity extraction template B3, and use the characters in the second character string corresponding to the common entity symbol in the entity extraction template B3 as the candidate entity, thereby extracting a candidate entity Ec3 from the second character string.

In one example, the entity extraction template is "*causes coughing, chest pain, and difficulty in breathing," and the second character string corresponding to the entity extraction template is "bronchial asthma causes coughing, chest pain, and difficulty in breathing." The information extraction apparatus is configured to compare the second character string "bronchial asthma causes coughing, chest pain, and difficulty in breathing" with the entity extraction template "*causes coughing, chest pain, and difficulty in breathing." The information extraction apparatus is further configured to determine that characters in the second character string corresponding to the common entity symbol "*" in the entity extraction template is "bronchial asthma." Accordingly, the information extraction apparatus is configured to use "bronchial asthma" as a candidate entity, thereby extracting the candidate entity "bronchial asthma" from the second character string.

In another example, the candidate entity extracted from the second character string may be "arrhythmia."

By applying this method, the information extraction apparatus can extract a plurality of candidate entities, thereby obtaining a candidate entity set. In one example, the candidate entity set is Ec={Ec1, Ec2, Ec3, . . . }.

Moreover, subsequent to the extraction of the plurality of candidate entities, the information extraction apparatus can obtain an entity seed-candidate entity set E. For example, the entity seed-candidate entity set may be E={e1, e2, e3, . . . , $e_m$}=Ec∪Es={Ec1, Ec2, Ec3, . . . , Es1, Es2, Es3, . . . }. The entity seed-candidate entity set E includes a plurality of entities (e.g., m numbers of entities, m is an integer greater than zero). The plurality of entities includes a plurality of entity seeds and a plurality of entity candidates.

In some embodiments, the information extraction apparatus is further configured to extract a candidate attribute from the target corpus based on each of the plurality of candidate entities and an attribute extraction template, thereby obtaining the plurality of candidate attributes. The attribute extraction template may be a pre-set template. Optionally, one or more attribute extraction templates may be used. In one example, the attribute extraction template is "*causes # and #". The symbol "*" stands for a common entity symbol, the symbol "#" stands for a common attribute symbol. In another example, the information extraction apparatus is configured to extract a candidate attribute from the target corpus M based on the attribute extraction template being "*causes # and #" and each of the plurality of candidate entities, e.g., Ec1, Ec2, Ec3, etc.

Figures 2, 3, 4, 5:
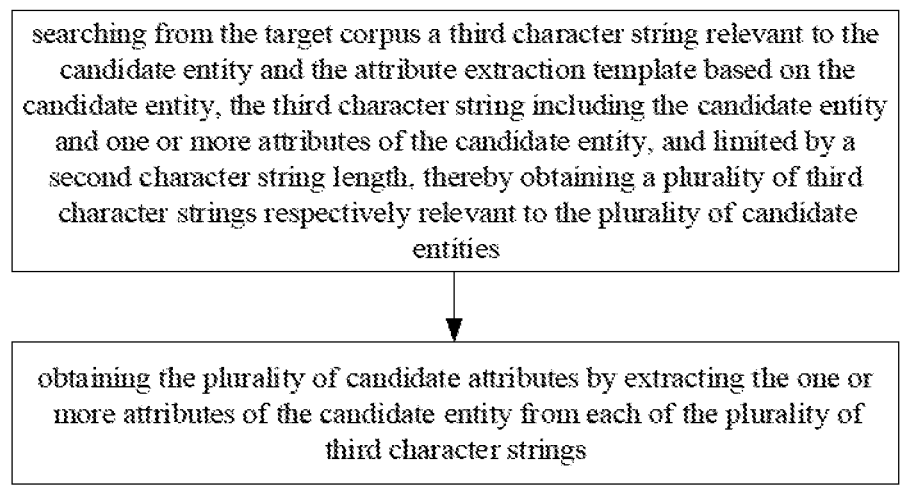
Figures 2, 3, 4, 5, 6:
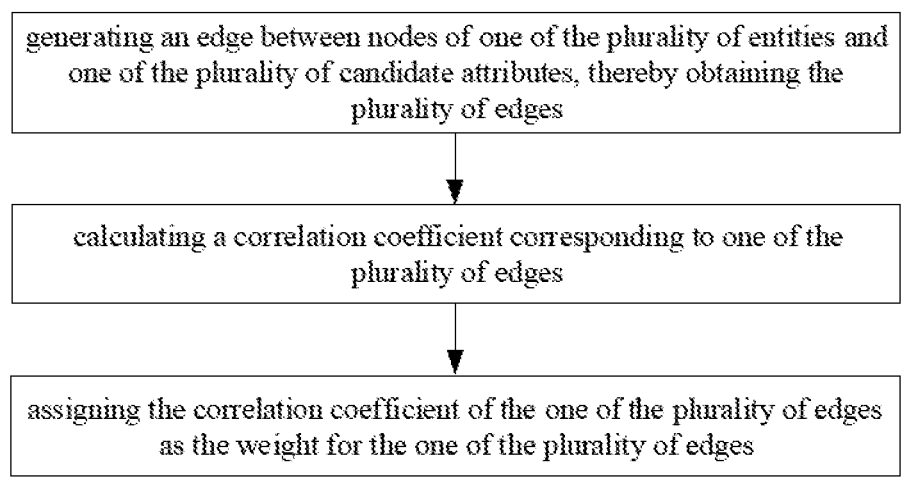

FIG. 2-5 is a flow chart illustrating a method of extracting a candidate attribute from the target corpus based on the plurality of candidate entities and an attribute extraction template in some embodiments according to the present disclosure. Referring to FIG. 5, the step of extracting the candidate attribute from the target corpus in some embodiments includes searching from the target corpus a third character string relevant to the candidate entity and the attribute extraction template based on the candidate entity, the third character string including the candidate entity and one or more attributes of the candidate entity, and limited by a third character string length, thereby obtaining a plurality of third character strings respectively relevant to the plurality of candidate entities; and obtaining the plurality of candidate attributes by extracting the one or more attributes of the candidate entity from each of the plurality of third character strings.

In some embodiments, the information extraction apparatus is configured to search from the target corpus a third character string relevant to the candidate entity and the attribute extraction template based on the candidate entity, the third character string including the candidate entity and one or more attributes of the candidate entity, and limited by a third character string length, thereby obtaining a plurality of third character strings respectively relevant to the plurality of candidate entities; and obtain the plurality of candidate attributes by extracting the one or more attributes of the candidate entity from each of the plurality of third character strings. Optionally, for each candidate entity and attribute extraction template, the information extraction apparatus is configured to determine more than one third character strings. Any appropriate character string length may be used in the searching step. Optionally, the third character string length is substantially the same as the first character string length. Optionally, the third character string length is substantially the same as the second character string length. Optionally, the third character string length is different from the first character string length. Optionally, the third character string length is different from the second character string length.

In some embodiments, based on each of a plurality of candidate entities (e.g., Ec1, Ec2, Ec3, etc.), the information extraction apparatus is configured to search from the target corpus M a third character string relevant to the candidate entity (e.g., each of candidate entities Ec1, Ec2, Ec3, etc.) and the attribute extraction template, thereby obtaining a plurality of third character strings respectively relevant to the plurality of candidate entities. Optionally, each of the third character strings includes one of the candidate entities Ec1, Ec2, Ec3, etc. and one or more attributes of the one of the candidate entities Ec1, Ec2, Ec3, etc. Optionally, the third character string is limited by a third character string length. In one example, a third character string relevant to the candidate entity Ec1 and the attribute extraction template includes the candidate entity Ec1 and one or more attributes of the candidate entity Ec1.

In one example, the target corpus M includes one or more unstructured medical texts, the candidate entity is "bronchial asthma," and the attribute extraction template is "*causes # and #." Based on the candidate entity being "bronchial asthma," the information extraction apparatus is configured to search from the target corpus M a third character string relevant to the candidate entity "bronchial asthma" and the attribute extraction template "*causes # and #." For example, the third character string may be "bronchial asthma causes wheezing and chest distress." The third character string includes the candidate entity "bronchial asthma," and a plurality of attributes of the candidate entity "bronchial asthma." For example, the third character string includes attributes such as "wheezing" and "chest distress."

In some embodiments, the information extraction apparatus is further configured to obtain the plurality of candidate attributes by extracting the one or more attributes of the candidate entity from each of the plurality of third character strings.

In some embodiments, the information extraction apparatus is configured to compare the third character string with the corresponding candidate entity and the attribute extraction template; determine characters in the third character string corresponding to the common attribute symbol in the attribute extraction template; and use the characters in the third character string corresponding to the common attribute symbol in the attribute extraction template as the candidate attribute, thereby extracting the candidate attribute from the third character string. In one example, the information extraction apparatus is configured to compare a third character string relevant to the candidate entity Ec1 and the attribute extraction template with the attribute extraction template, determine characters in the third character string corresponding to the common attribute symbol in the attribute extraction template, and use the characters in the third character string corresponding to the common attribute symbol in the attribute extraction template as the candidate attribute, thereby extracting a candidate attribute a1 from the third character string relevant to the candidate entity Ec1 and the attribute extraction template. In another example, the information extraction apparatus is configured to compare a third character string relevant to the candidate entity Ec2 and the attribute extraction template with the attribute extraction template, determine characters in the third character string corresponding to the common attribute symbol in the attribute extraction template, and use the characters in the third character string corresponding to the common attribute symbol in the attribute extraction template as the candidate attribute, thereby extracting a candidate attribute a2 from the third character string relevant to the candidate entity Ec2 and the attribute extraction template. In another example, the information extraction apparatus is configured to compare a third character string relevant to the candidate entity Ec3 and the attribute extraction template with the attribute extraction template, determine characters in the third character string corresponding to the common attribute symbol in the attribute extraction template, and use the characters in the third character string corresponding to the common attribute symbol in the attribute extraction template as the candidate attribute, thereby extracting a candidate attribute a3 from the third character string relevant to the candidate entity Ec3 and the attribute extraction template.

In one example, the third character string is "bronchial asthma causes wheezing and chest distress," and the attribute extraction template is "*causes # and #." The information extraction apparatus is configured to compare the third character string "bronchial asthma causes wheezing and chest distress" with the attribute extraction template "*causes # and #." The information extraction apparatus is further configured to determine that characters in the third character string corresponding to the common attribute symbol "#" in the attribute extraction template is "wheezing" and "chest distress." Accordingly, the information extraction apparatus is configured to use "wheezing" and "chest distress" as candidate attributes, thereby extracting the candidate attributes "wheezing" and "chest distress" from the third character string.

By applying this method, the information extraction apparatus can extract a plurality of candidate attributes, thereby obtaining a candidate attribute set. In one example, the candidate attribute set is A={a1, a2, a3, . . . , $a_n$}, n is an integer greater than zero.

In some embodiments, subsequent to obtaining the plurality of candidate entities and the plurality of candidate attributes, the information extraction apparatus is configured to establish a plurality of correlations between the plurality of candidate attributes and a plurality of entities including the plurality of candidate entities and the plurality of entity seeds. In one example, the plurality of entities are m numbers of entities in an entity seed-candidate entity set E={e1, e2, e3, . . . , $e_m$}=Ec∪Es={Ec1, Ec2, Ec3, . . . , Es1, Es2, Es3, . . . }. In another example, the plurality of candidate attributes are n numbers of candidate attributes in an candidate attribute set A={a1, a2, a3, . . . , $a_n$}.

In some embodiments, the correlations between the plurality of candidate attributes and a plurality of entities can be represented by an entity-attribute table. In some embodiments, the correlations between the plurality of candidate attributes and a plurality of entities can be represented by an entity-attribute graph. Optionally, the entity-attribute graph includes a plurality of nodes and a plurality of edges, each of the plurality of nodes representing one of the plurality of entities or one of the plurality of candidate attributes, each of the plurality of edges representing one of the plurality of correlations between one of the plurality of entities and one of the plurality of candidate attributes. Each of the plurality of edges is associated with a weight representing a correlation coefficient of the one of the plurality of correlations.

FIG. 2-6 is a flow chart illustrating a method of establishing a plurality of correlations between the plurality of candidate attributes and a plurality of entities in some embodiments according to the present disclosure. Referring to FIG. 2-6, the step of establishing the plurality of correlations in some embodiments includes generating an edge between nodes of one of the plurality of entities and one of the plurality of candidate attributes, thereby obtaining the plurality of edges; calculating a correlation coefficient corresponding to one of the plurality of edges; and assigning the correlation coefficient of the one of the plurality of edges as the weight for the one of the plurality of edges.

In some embodiments, the information extraction apparatus is configured to determine which entities and which candidate attributes are correlated based on their context in the target corpus, e.g., the information extraction apparatus is configured to determine the presence of correlations between one or more of the plurality of entities and one or more of the plurality of candidate attributes, based on the context in the target corpus of the one or more of the plurality of entities and the one or more of the plurality of candidate attributes. Based on a result of the determination, the information extraction apparatus is configured to generate an edge between nodes of one of the plurality of entities and one of the plurality of candidate attributes where a correlation is found, thereby obtaining the plurality of edges. Optionally, the correlation is a semantic correlation.

In one example, the information extraction apparatus is configured to determine which entities in the m entities of the entity seed-candidate entity set E={e1, e2, e3, . . . , $e_m$} and which candidate attributes in the n candidate attributes of the candidate attribute set A={a1, a2, a3, . . . , $a_n$} are correlated based on the context in the target corpus M. For example, the information extraction apparatus is configured to determine the a presence or absence of a correlation between the entity e1 and any candidate attribute of the candidate attribute set A={a1, a2, a3, ..., a$_n$}, and generate an edge between a node representing the entity e1 and a node representing a candidate attribute found to be correlated to the entity e1. In another example, a correlation is found between the entity e1 and a candidate attribute a1, and between the entity e1 and a candidate attribute a3. The information extraction apparatus is configured to generate an edge between a node representing the entity e1 and a node representing the candidate attribute a1, and generate an edge between a node representing the entity e1 and a node representing the candidate attribute a3. Along the same line, the information extraction apparatus is configured to obtain a plurality of edges between correlated entities (e1, e2, e3, ..., e$_m$) and candidate attribute (a1, a2, a3, ..., a$_n$). In the entity-attribute graph, the plurality of nodes represent the plurality of entities and the plurality of candidate attributes. The entity-attribute graph includes a set of nodes V=E∪A.

In one example, the plurality of entities include "acute bronchitis," "bronchial asthma," and "arrhythmia," and the plurality of candidate attributes include "coughing," "wheezing," and "angina pectoris." Based on the context of the entities "acute bronchitis," "bronchial asthma," and "arrhythmia," and the candidate attributes "coughing," "wheezing," and "angina pectoris" in the target corpus M, the information extraction apparatus is configured to determine which entities and which candidate attributes are correlated, e.g., having a semantic correlation. In another example, the information extraction apparatus determines that the entity "acute bronchitis" is correlated to the candidate attributes "coughing" and "wheezing," the entity "bronchial asthma" is correlated to the candidate attributes "coughing" and "wheezing," and the entity "arrhythmia" is correlated to the candidate attributes "wheezing" and "angina pectoris." Accordingly, the information extraction apparatus generates an edge between a node representing "acute bronchitis" and nodes representing "coughing" and "wheezing," generates an edge between a node representing "bronchial asthma" and nodes representing "coughing" and "wheezing," and generates an edge between a node representing "arrhythmia" and nodes representing "wheezing" and "angina pectoris." In the entity-attribute graph, the entities "acute bronchitis," "bronchial asthma," and "arrhythmia," and the candidate attributes "coughing," "wheezing," and "angina pectoris," are nodes. FIG. 2-7 shows an exemplary entity-attribute graph in some embodiments according to the present disclosure. The entity-attribute graph in FIG. 2-7 includes six nodes and six edges.

In some embodiments, subsequent to generating the plurality of edges, the information extraction apparatus is further configured to calculate a correlation coefficient corresponding to one of the plurality of edges. Examples of correlation coefficients include, but are not limited to, semantic correlation, semantic similarity, occurrence frequency of an entity or a candidate attribute, probability of an entity and a candidate attribute to be adjacent to each other, and so on. In one example, the information extraction apparatus is further configured to calculate a correlation coefficient for a correlation between "acute bronchitis" and "coughing," a correlation between "acute bronchitis" and "wheezing," a correlation between "bronchial asthma" and "coughing," and a correlation between "arrhythmia" and "angina pectoris."

In some embodiments, the correlation coefficient is calculated using a distribution-based method. Optionally, the method includes calculating the correlation coefficient corresponding to one of the plurality of edges based on a context in the target corpus of one of the plurality of entities and one of the plurality of candidate attributes represented by nodes connected to the one of the plurality of edges. Optionally, the method includes calculating the correlation coefficient corresponding to one of the plurality of edges based on a context and co-occurrence information in the target corpus of one of the plurality of entities and one of the plurality of candidate attributes represented by nodes connected to the one of the plurality of edges. In one example, the co-occurrence information refers to a simultaneous occurrence of a plurality of words (e.g., entities and candidate attributes) in a relative vicinity in one text or document. In one example, the information extraction apparatus is configured to calculate the correlation coefficient (e.g., semantic correlation) corresponding to the entity "acute bronchitis" and the candidate attribute "coughing," based on the context and co-occurrence information in the target corpus of the entity "acute bronchitis" and the candidate attribute "coughing."

In some embodiments, the correlation coefficient is calculated using a word embedding-based method. Optionally, the step of calculating the correlation coefficient corresponding to the one of the plurality of edges includes mapping one of the plurality of entities and one of the plurality of candidate attributes represented by nodes connected to the one of the plurality of edges to a semantic space (e.g., a latent semantic space) using a neural network; and calculating the correlation coefficient corresponding to the one of the plurality of edges in the semantic space. In one example, the information extraction apparatus is configured to map the entity "acute bronchitis" and the candidate attribute "coughing" to a semantic space, and calculate the correlation coefficient (e.g., a semantic correlation) corresponding to the entity "acute bronchitis" and the candidate attribute "coughing" in the semantic space.

In some embodiments, the correlation coefficient is calculated using an explicit semantic analysis-based method. Optionally, the step of calculating the correlation coefficient corresponding to the one of the plurality of edges includes mapping one of the plurality of entities and one of the plurality of candidate attributes represented by nodes connected to the one of the plurality of edges to a concept space; and calculating the correlation coefficient corresponding to the one of the plurality of edges in the concept space. Examples of concept spaces include, but are not limited to, Baidupedia ("Baidn Baike"), Wikipedia, and so on. In one example, the information extraction apparatus is configured to map the entity "acute bronchitis" and the candidate attribute "coughing" to a concept space, and calculate the correlation coefficient (e.g., a semantic correlation) corresponding to the entity "acute bronchitis" and the candidate attribute "coughing" in the concept space.

In some embodiments, subsequent to calculating the correlation coefficient corresponding to one of the plurality of edges, the information extraction apparatus is further configured to assign the correlation coefficient of the one of the plurality of edges as the weight for the one of the plurality of edges. In one example, the weight is represented by $w_{i,j}$, representing a weight for the edge connecting the nodes corresponding to the entity $e_i$ and the candidate attribute $a_j$; i is less than or equal to m, and j is less than or equal to n. In one example, the information extraction apparatus assigns the correlation coefficient of an edge connecting the nodes "acute bronchitis" and "coughing" as the weight for the edge.

FIG. 2-7 shows an entity-attribute graph having weights assigned to multiple edges in the graph. For example, the edge connecting the nodes corresponding to "acute bronchitis" and "coughing" is assigned a weight 0.8, the edge connecting the nodes corresponding to "acute bronchitis" and "wheezing" is assigned a weight 0.5, the edge connecting the nodes corresponding to "bronchial asthma" and "wheezing" is assigned a weight 0.6, and the edge connecting the nodes corresponding to "bronchial asthma" and "coughing" is assigned a weight 0.7, and so on.

Figures 2, 3, 4, 5, 6, 7:
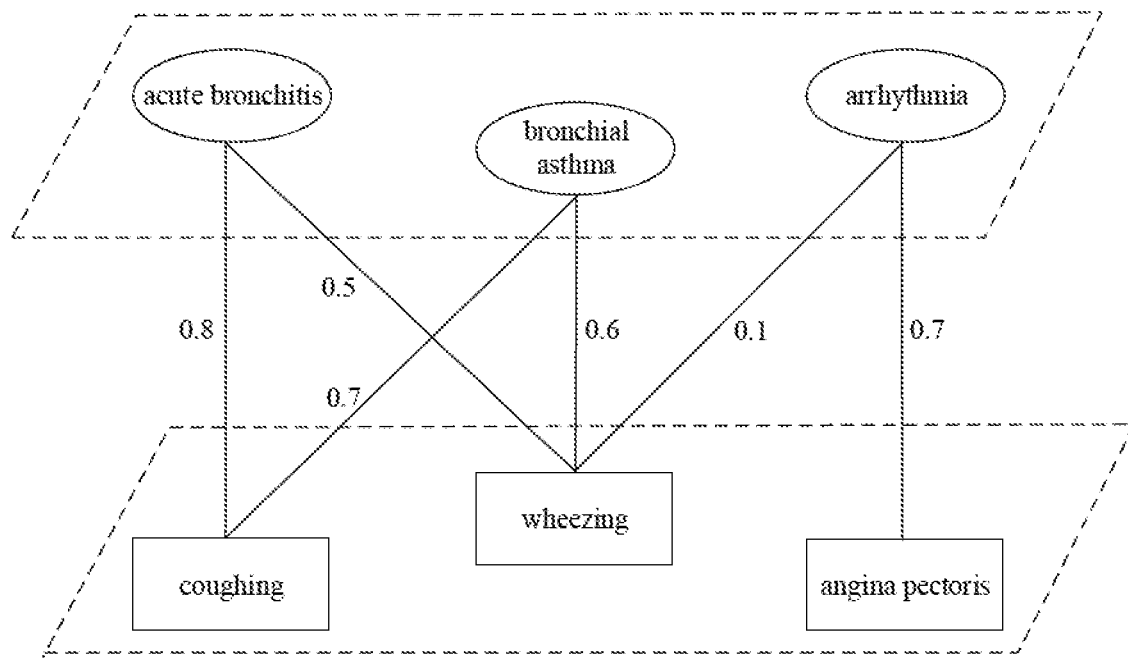
Figures 2, 3, 4, 5, 6, 7, 8, 9:
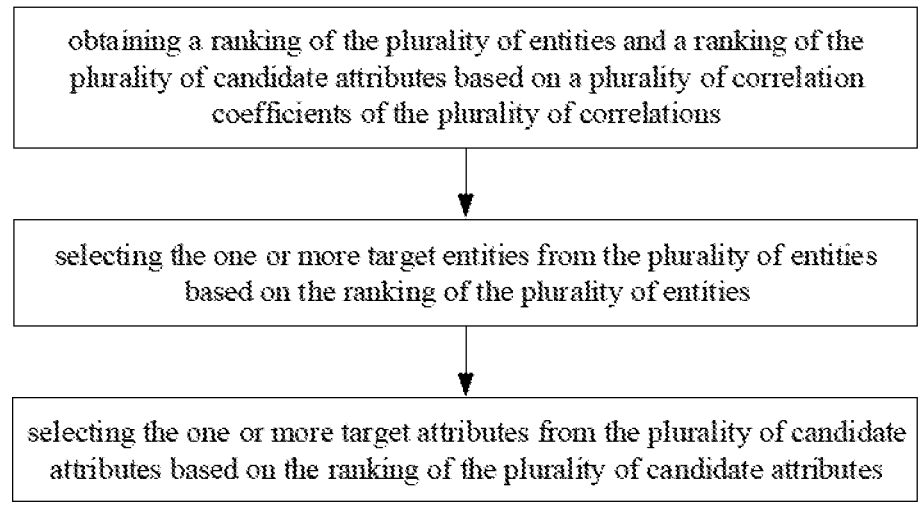
Figures 2, 3, 4, 5, 6, 7, 8, 9, 10:
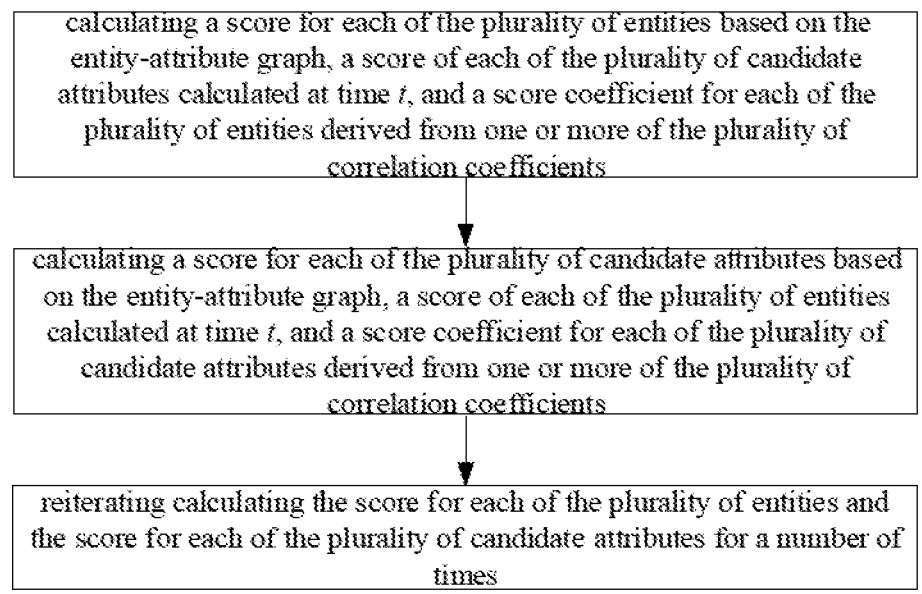
Figures 2, 3, 4, 5, 6, 7, 8, 9, 10, 11:
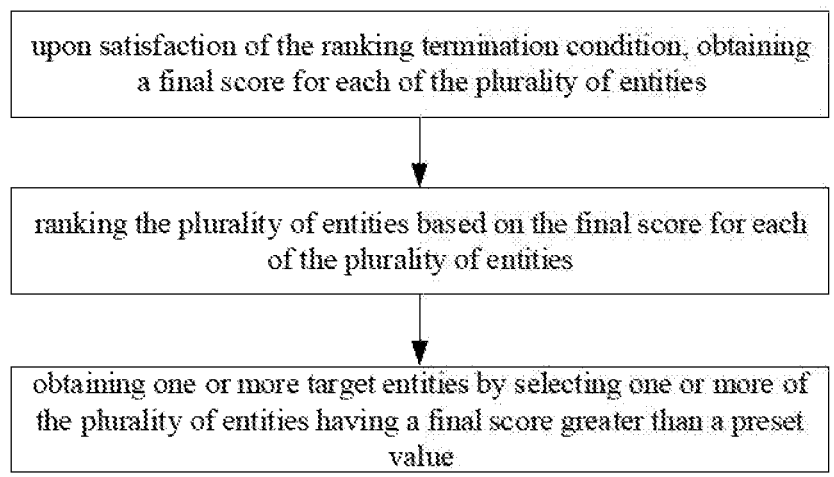
Figures 2, 3, 4, 5, 6, 7, 8, 9, 10, 11, 12:
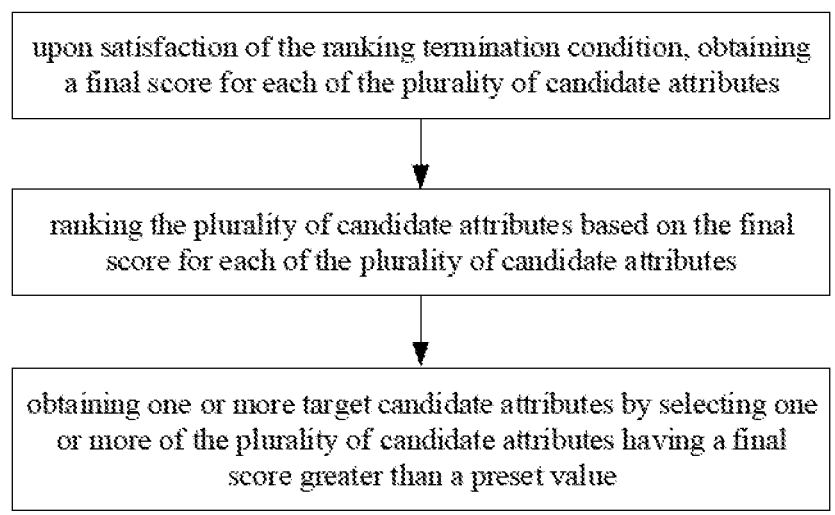
Figures 2, 3, 4, 5, 6, 7, 8, 9, 10, 11, 12, 13:
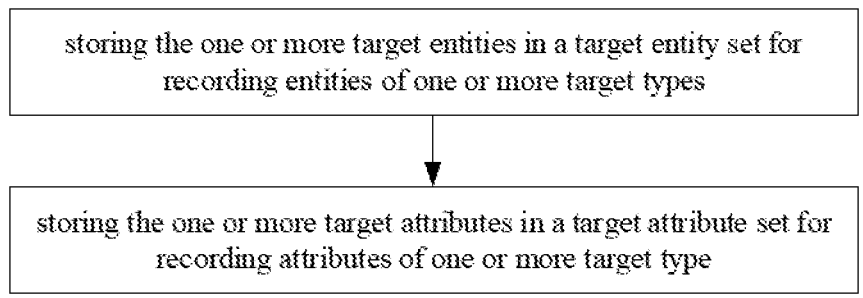
Figures 2, 3, 4, 5, 6, 7, 8, 9, 10, 11, 12, 13, 14:
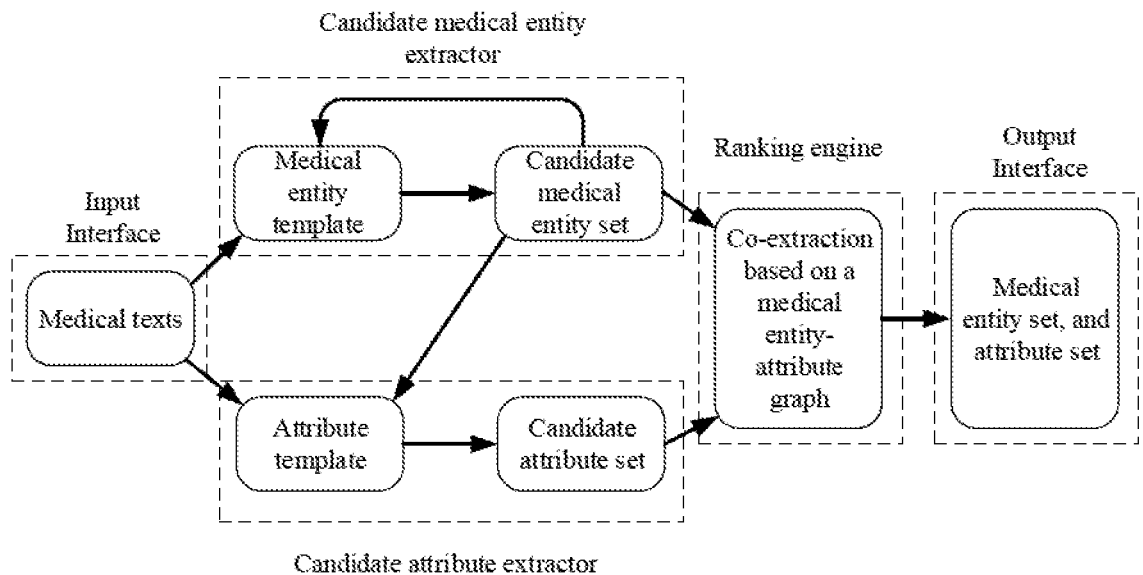
Figures 1, 3:
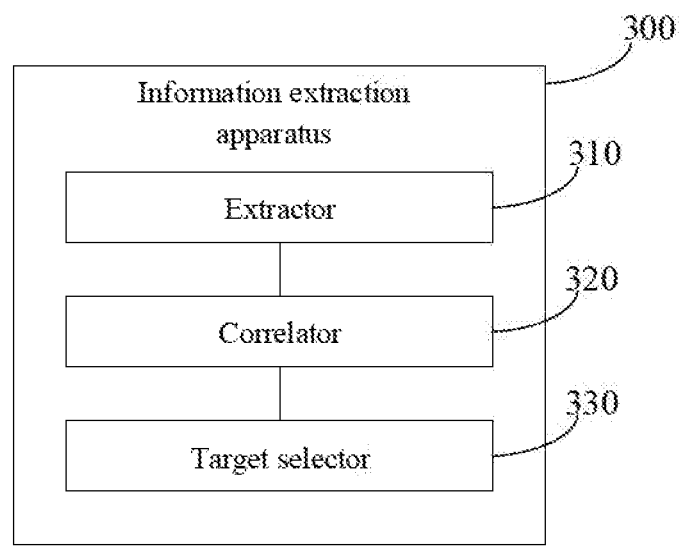
Figures 2, 3:
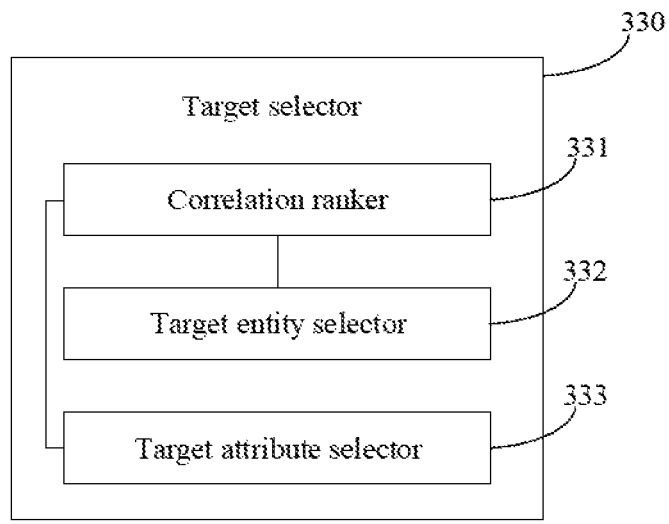
Figure 3:
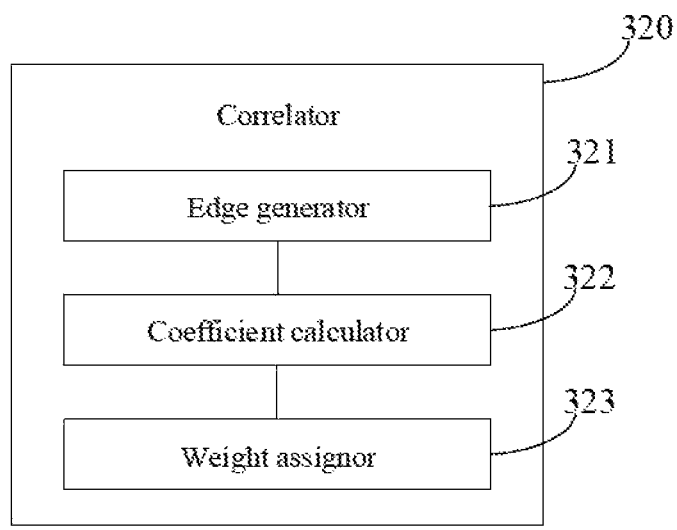
Figures 3, 4:
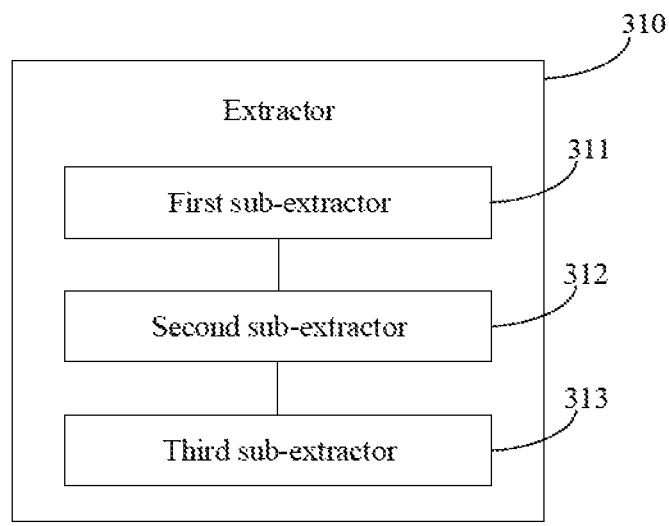
Figures 3, 4, 5:
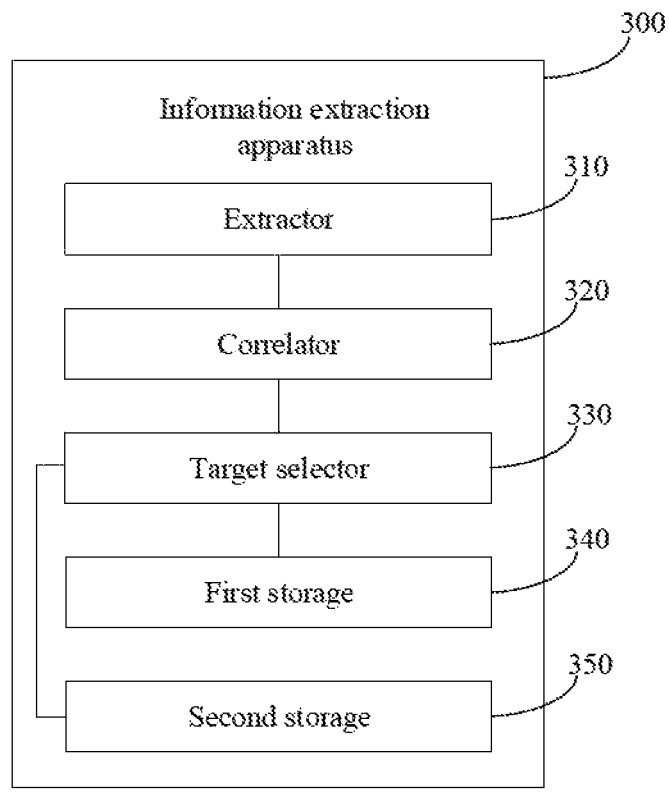

In FIG. 7, the edges are only generated for nodes for entities and candidate attributes that are correlated to each other. In some embodiments, the edges are generated between any pair of entity and candidate attribute. For the edges connecting nodes that are not correlated, a weight of zero is assigned.

In some embodiments, the correlations between the plurality of candidate attributes and a plurality of entities can be represented by an entity-attribute table. FIG. 2-8 shows an exemplary entity-attribute table in some embodiments according to the present disclosure. Referring to FIG. 2-8, a correlation coefficient between the entity "acute bronchitis" and the candidate attribute "coughing" is 0.8, a correlation coefficient between the entity "acute bronchitis" and the candidate attribute "wheezing" is 0.5, a correlation coefficient between the entity "acute bronchitis" and the candidate attribute "angina pectoris" is 0, and so on.

In some embodiments, the method further includes selecting one or more target entities from the plurality of entities and one or more target attributes from the plurality of candidate attributes based on the plurality of correlations. FIG. 2-9 is a flow chart illustrating a method of selecting a target entity from the plurality of entities and a target attribute from the plurality of candidate attributes in some embodiments according to the present disclosure. Referring to FIG. 2-9, the step of selecting the one or more target entities from the plurality of entities and the one or more target attributes from the plurality of candidate attributes in some embodiments includes obtaining a ranking of the plurality of entities and a ranking of the plurality of candidate attributes based on a plurality of correlation coefficients of the plurality of correlations; selecting the one or more target entities from the plurality of entities based on the ranking of the plurality of entities; and selecting the one or more target attributes from the plurality of candidate attributes based on the ranking of the plurality of candidate attributes.

In some embodiments, subsequent to generating the entity-attribute graph, the information extraction apparatus is configured to rank the plurality of entities and the plurality of candidate attributes based on the entity-attribute graph. Optionally, based on the entity-attribute graph, the information extraction apparatus is configured to rank the plurality of entities E={e1, e2, e3, . . . , $e_m$} and the plurality of candidate attributes A={a1, a2, a3, . . . , $a_n$}. In one example, the method involves a plurality of ranking steps. In another example, in the first ranking step, all entity seeds in the entity seed-candidate entity set E={e1, e2, e3, . . . , $e_m$} are assigned a score of 1, all candidate entities in the entity seed-candidate entity set E={e1, e2, e3, . . . , $e_m$} are assigned a score of 0, and all candidate attributes in the candidate attribute set A={a1, a2, a3, . . . , $a_n$} are assigned a score of 0.

FIG. 2-10 is a flow chart illustrating a method of obtaining a ranking of the plurality of entities and a ranking of the plurality of candidate attributes in some embodiments according to the present disclosure. Referring to FIG. 2-10, the step of obtaining a ranking of the plurality of entities and a ranking of the plurality of candidate attributes in some embodiments includes calculating a score for each of the plurality of entities based on the entity-attribute graph, a score for each of the plurality of candidate attributes calculated at time t, and a score coefficient for each of the plurality of entities derived from one or more of the plurality of correlation coefficients; calculating a score for each of the plurality of candidate attributes based on the entity-attribute graph, a score for each of the plurality of entities calculated at time t, and a score coefficient for each of the plurality of candidate attributes derived from one or more of the plurality of correlation coefficients; and reiterating calculating the score for each of the plurality of entities and the score for each of the plurality of candidate attributes for a number of times.

In some embodiments, the information extraction apparatus is configured to calculate a score for each of the plurality of entities based on (1) the entity-attribute graph, (2) a score for each of the plurality of candidate attributes calculated at time t, and (3) a score coefficient for each of the plurality of entities derived from one or more of the plurality of correlation coefficients. Optionally, the score for each of the plurality of entities is calculated based on Equation (1):

$$S_{t+1}(e_i) = \sum_j S_t(a_j) \times \frac{w_{i,j}}{\sum_k w_{k,j}}; \qquad (1)$$

wherein $S_{t+1}(e_i)$ stands for a score for an entity $e_i$ of the plurality of entities calculated at time (t+1), $S_t(a_j)$ stands for a score for an candidate attribute $a_j$ of the plurality of candidate attributes calculated at time t, $$\frac{w_{i,j}}{\sum_k w_{k,j}}$$

stands for the score coefficient for the plurality of entities, $w_{i,j}$ stands for a weight for an edge between a node corresponding to the entity $e_i$ and a node corresponding to the candidate attribute $a_j$, $w_{k,j}$ stands for a weight for an edge between a node corresponding to the entity $e_k$ and a node corresponding to the candidate attribute $a_j$, j stands for a number of edges connected to the node corresponding to the entity $e_i$ in the entity-attribute graph, and k stands for a number of edges connected to the node corresponding to the candidate attribute $a_j$ in the entity-attribute graph.

During the ranking process, the more likely an entity is of a target type, the higher the score is. In one example, the target type is "respiratory diseases." The entity "acute bronchitis" is ranked higher than the entity "arrhythmia," i.e., the entity "acute bronchitis" has a score higher than that of the entity "arrhythmia."

Referring to FIG. 2-7, the entity $e_i$ is bronchial asthma, and the candidate attributes correlated to the entity $e_i$ include "coughing" and "wheezing." In the entity-attribute graph, there are two edges in total that are connected to the node representing the entity $e_i$, i.e., j=2. In the entity-attribute graph, there are two edges in total that are connected to the node representing the candidate attribute "coughing", i.e., k=2. In the entity-attribute graph, there are three edges in total that are connected to the node representing the candidate attribute "wheezing", i.e., k=3. At the time t, the score, St (coughing), for a candidate attribute "coughing" is 0.8. Accordingly, the score for the entity "bronchial asthma" calculated at time (t+1) is $$S_{t+1}(e_i) = \sum_j S_t(a_j) \times \frac{w_{i,j}}{\sum_k w_{k,j}},$$

which is equal to $$St\text{ (coughing)} * \frac{0.7}{0.8 * 0.7} + St\text{ (wheezing)} * \frac{0.6}{0.5 + 0.6 + 0.1} =$$
$$0.8 * \frac{7}{15} + 0.5 * \frac{1}{2} = 0.62.$$

Similarly, the scores for the entities "acute bronchitis" and "arrhythmia" at time (t+1) can be calculated accordingly. During the ranking process, the higher the score for the candidate attribute $a_j$ that is correlated to the entity $e_i$, the higher the score for the entity $e_i$ is. The higher the correlation between the entity $e_i$ and the candidate attribute $a_j$ the higher the score for the entity $e_i$ is.

In some embodiments, the information extraction apparatus is configured to calculate a score for each of the plurality of candidate attributes based on (1) the entity-attribute graph, (2) a score of each of the plurality of entities calculated at time t, and (3) a score coefficient for each of the plurality of candidate attributes derived from one or more of the plurality of correlations. Optionally, the score for each of the plurality of candidate attributes is calculated based on Equation (2):

$$S_{t+1}(a_j) = \sum_i S_t(e_i) \times \frac{w_{i,j}}{\sum_k w_{i,p}}; \quad (2)$$

wherein $S_{t+1}(a_j)$ stands for a score for the candidate attribute $a_j$ of the plurality of candidate attributes calculated at time (t+1), $S_t(e_i)$ stands for a score for the entity $e_i$ of the plurality of entities calculated at time t, $$\frac{w_{i,j}}{\sum_k w_{i,p}}$$

stands for the score coefficient for the plurality of candidate attributes, $w_{i,p}$ stands for a weight for an edge between the node corresponding to the entity $e_i$ and a node corresponding to the candidate attribute $a_p$, i stands for the number of edges connected to the node corresponding to the candidate attribute $a_j$ in the entity-attribute graph, and p stands for the number of edges connected to the node corresponding to the entity $e_i$ in the entity-attribute graph.

During the ranking process, the more likely a candidate attribute is of a target type, the higher the score is. In one example, the target type is "respiratory diseases." The candidate attribute "chest distress" is ranked higher than the candidate attribute "angina pectoris," i.e., the candidate attribute "chest distress" has a score higher than that of the candidate attribute "angina pectoris."

Referring to FIG. 2-7, the candidate attribute $a_j$ is coughing, and the entities correlated to the candidate attribute $a_j$ include "acute bronchitis" and "bronchial asthma." In the entity-attribute graph, there are two edges in total that are connected to the node representing the candidate attribute $a_j$, i.e., i=2. In the entity-attribute graph, there are two edges in total that are connected to the node representing the entity "acute bronchitis". i.e., k=2. In the entity-attribute graph, there are two edges in total that are connected to the node representing the entity "bronchial asthma", i.e., k=2. At the time t, the score, St (acute bronchitis), for the entity "acute bronchitis" is 1, and the score, St (bronchial asthma), for the entity "bronchial asthma" is 0. Accordingly, the score for the candidate attribute $a_j$ "coughing" calculated at time (t+1) is $$S_{t+1}(a_j) = \sum_i S_t(e_i) \times \frac{w_{i,j}}{\sum_k w_{i,p}},$$

which is equal to $$St\text{ (acute bronchitis)} * \frac{0.8}{0.8 + 0.7} + St(\text{bronchial asthma}) * \frac{0.7}{0.7 + 0.6} =$$
$$1 * \frac{8}{15} + 0 * \frac{7}{13} = 0.53.$$

Similarly, the scores for the candidate attributes "wheezing" and "angina pectoris" at time (t+1) can be calculated accordingly. During the ranking process, the higher the score for the entity $e_i$ that is correlated to the candidate attribute $a_j$, the higher the score for the candidate attribute $a_j$ is. The higher the correlation between the candidate attribute $a_j$ and the entity $e_i$, the higher the score for the candidate attribute $a_j$ is.

In some embodiments, the information extraction apparatus is configured to reiterate calculating the score for each of the plurality of entities and the score for each of the plurality of candidate attributes for a number of times, e.g., until a ranking termination condition is satisfied. Various appropriate ranking termination conditions may be used. Optionally, the ranking termination condition is a fixed number of ranking steps. Optionally, the ranking termination condition is a convergence of score. Optionally, the method includes reiterating calculating the score for each of the plurality of entities and the score for each of the plurality of candidate attributes until the score for each of the plurality of entities converges, and the score for each of the plurality of candidate attributes converges.

In some embodiments, the score for each of the plurality of entities converges refers to the score does not change or changes in the score is limited to a range (e.g., a preset range). In one example, the scores of the entity $e_i$ at time (t+1), time (t+2), time (t+3), time (t+4) are substantially the same or have a variation within a limited range (e.g., the preset range), it can be determined that the score for each of the plurality of entities converges. When the score for each of the plurality of entities converges, and the score for each of the plurality of candidate attributes converges, the ranking termination condition is satisfied, and the score calculation is not reiterated any more. The ranking processes involving Equations (1) and (2) above are both processes having Markov convergence. For example, the score for each of the plurality of entities and the score for each of the plurality of candidate attributes, after the calculation processes are reiterated for a number of times (e.g., 10,000 times), will converge. Accordingly, the score convergence can be used as the ranking termination condition.

Various appropriate numbers of reiteration steps may be used. In one example, the number of reiteration steps is 100, the step of calculating the score for each of the plurality of entities is reiterated for 100 times, and the step of calculating the score for each of the plurality of candidate attributes is reiterated for 100 times, the ranking termination condition is deemed to be satisfied. By having a pre-set ranking termination condition, unnecessary computation can be avoided.

In some embodiments, the information extraction apparatus is configured to select the one or more target entities from the plurality of entities based on the ranking of the plurality of entities. FIG. 2-11 is a flow chart illustrating a method of selecting a target entity from the plurality of entities based on a ranking of the plurality of entities in some embodiments according to the present disclosure. Referring to FIG. 2-11, the step of selecting the one or more target entities from the plurality of entities in some embodiments includes, upon satisfaction of the ranking termination condition, obtaining a final score for each of the plurality of entities; ranking the plurality of entities based on the final score for each of the plurality of entities; and obtaining one or more target entities by selecting one or more of the plurality of entities having a final score greater than a preset value.

In some embodiments, the information extraction apparatus is configured to obtain a final score for each of the plurality of entities when the ranking termination condition is deemed satisfied. In one example, the information extraction apparatus uses the score for each of the plurality of entities in the last round of reiteration as the final score for each of the plurality of entities. In one example, the information extraction apparatus is configured to obtain a final score for each of the plurality of entities $e1, e2, e3, \ldots, e_m$.

In some embodiments, the information extraction apparatus is configured to rank the plurality of entities based on the final score for each of the plurality of entities. Optionally, the information extraction apparatus is configured to rank the plurality of entities from the highest score to the lowest score. In one example, the information extraction apparatus is configured to rank the plurality of entities, $e1, e2, e3, \ldots, e_m$, from the highest score to the lowest score.

In some embodiments, the information extraction apparatus is configured to obtain one or more target entities by selecting one or more of the plurality of entities having a final score greater than a preset value. In one example, the preset value is 0.5, and the information extraction apparatus select one or more of the plurality of entities $e1, e2, e3, \ldots, e_m$ having a final score greater than 0.5 as the one or more target entities.

In some embodiments, the information extraction apparatus is configured to select one or more target attributes from the plurality of candidate attributes based on a ranking of the plurality of candidate attributes. FIG. 2-12 is a flow chart illustrating a method of selecting a target attribute from the plurality of candidate attributes based on a ranking of the plurality of candidate attributes in some embodiments according to the present disclosure. Referring to FIG. 2-12, the step of selecting the one or more target attributes from the plurality of candidate attributes in some embodiments includes, upon satisfaction of the ranking termination condition, obtaining a final score for each of the plurality of candidate attributes; ranking the plurality of candidate attributes based on the final score for each of the plurality of candidate attributes; and obtaining one or more target candidate attributes by selecting one or more of the plurality of candidate attributes having a final score greater than a preset value.

In some embodiments, the information extraction apparatus is configured to obtain a final score for each of the plurality of candidate attributes when the ranking termination condition is deemed satisfied. In one example, the information extraction apparatus uses the score for each of the plurality of candidate attributes in the last round of reiteration as the final score for each of the plurality of candidate attributes. In one example, the information extraction apparatus is configured to obtain a final score for each of the plurality of candidate attributes $a1, a2, a3, \ldots, a_n$.

In some embodiments, the information extraction apparatus is configured to rank the plurality of candidate attributes based on the final score for each of the plurality of candidate attributes. Optionally, the information extraction apparatus is configured to rank the plurality of candidate attributes from the highest score to the lowest score. In one example, the information extraction apparatus is configured to rank the plurality of candidate attributes, $a1, a2, a3, \ldots, a_n$, from the highest score to the lowest score.

In some embodiments, the information extraction apparatus is configured to obtain one or more target candidate attributes by selecting one or more of the plurality of candidate attributes having a final score greater than a preset value. In one example, the preset value is 0.5, and the information extraction apparatus select one or more of the plurality of candidate attributes, $a1, a2, a3, \ldots, a_n$ having a final score greater than 0.5 as the one or more target candidate attributes.

In some embodiments, subsequent to selecting one or more target entities and one or more target attributes, the information extraction apparatus is further configured establish a structured text based on the one or more target entities and the one or more target attributes. FIG. 2-13 is a flow chart illustrating a method of establishing a structured text based on the target entities and the target attributes in some embodiments according to the present disclosure. Referring to FIG. 2-13, the step of establishing a structured text in some embodiments includes storing the one or more target entities in a target entity set for recording entities of one or more target types; and storing the one or more target attributes in a target attribute set for recording attributes of one or more target types.

In some embodiments, the information extraction apparatus is configured to maintain the target entity set for recording entities of one or more target types. Optionally, the information extraction apparatus is configured to store one or more target entities in a target entity set. In some embodiments, the information extraction apparatus is configured to maintain the target attribute set for recording attributes of one or more target types. Optionally, the information extraction apparatus is configured to store one or more target attributes in a target attribute set. Optionally, the structured text based on the target entities and the target attributes is established once the one or more target entities are stored in the target entity set and the one or more target attributes are stored in the target attribute set.

In some embodiments, there is no pre-existing target entity set and pre-existing target attribute set, the information extraction apparatus is configured to first establish a target entity set and a target attribute set. Subsequent to the establishment of the target entity set and the target attribute set, the information extraction apparatus is configured to store one or more target entities in a target entity set and store one or more target attributes in a target attribute set.

In the present method, based on a plurality of entity seeds of one or more target types in an entity seeds set, a plurality of candidate entities and a plurality of candidate attributes are extracted from a target corpus. A plurality of correlations are established between the plurality of candidate attributes and a plurality of entities including the plurality of candidate entities and the plurality of entity seeds. Subsequently, one or more target entities from the plurality of entities and one or more target attributes from the plurality of candidate attributes are selected based on the plurality of correlations. In the present method, the target entities and the target attributes are selected based on the correlations between the plurality of candidate attributes and a plurality of entities, obviating the semantic drifting issue in the conventional information extraction method.

Specifically, the entity extraction process in the conventional information extraction method is associated with the semantic drifting issue, and the attribute extraction process in the conventional information extraction method is associated with the sparse data issue. In some embodiments of the present information extraction method, the correlation between the entity and the attribute is established using an entity-attribute graph, and the correlation between the entity and the attribute is used in monitoring the extraction process of the target entity and the target attribute, achieving co-extraction of entity and attribute. By co-extracting entity and attribute based on their inherent correlation, the semantic drifting issue in the entity extraction process as well as the sparse data issue in the attribute extraction process can be obviated, enhancing extraction performance.

By converting unstructured texts into structured texts, it makes it easier to have the latent rules and knowledges in the texts revealed to a user, and helps enhancing the user's understanding of the texts. A critical step involved in the conversion process is the extraction of entities and attributes of certain types. Accordingly, entity set expansion and attribute extraction have become a focus of research and development. The entity set expansion refers to expansion of a given set of entity seeds to include other semantically similar items, e.g., extraction of semantically similar entities from a target corpus based on entity seeds of a certain type in the set of entity seeds. In one example, the target type is "countries", the set of entity seeds is a set of {China, United States, Russia}, and the entity set expansion enables the extraction of similar entities of a same type such as "Japan" and "Brazil" from the target corpus. The attribute extraction enables extraction of important attribute of a same target type from the corpus, e.g., extraction of attributes "capital city," "leader of the country," and "national flag."

Conventional entity set expansion and attribute extraction methods are mostly open domain methods. Entity set expansion may be performed using a distribution-based method, a template-based method, and a combination method. In the distribution-based method, a statistic analysis is performed to analyze the context of candidate entities, and based on the context, the similarity between candidate entities and entity seeds is calculated, the candidate entities are ranked in the order of similarity, and target entities are determined. In the template-based method, candidate entities are extracted from the target corpus using a template, the candidate entities are ranked, and target entities are determined based on the ranking. In the combination method, the candidate entities are extracted respectively using a distribution-based method and a template-based method respectively from different corpuses, the extracted entities are merged and ranked, and target entities are determined based on the ranking. Conventional attribute extraction methods are mostly performed using a distribution-based method or a template-based method. In medical filed, information extraction is mostly utilized in named entity recognition.

In conventional information extraction methods, entity set expansion and attribute extraction are treated as two separate and distinct tasks, or as two components or steps connected in a pipeline of workflow. Entity set expansion typically is associated with the semantic drifting issues, e.g., candidate entities of an irrelevant different type are extracted and included in the expanded entity set. For example, an entity "pancreatic cancer" may be included in an entity set of a target type "diabetes" by a conventional entity set expansion process. Attribute extraction typically is associated with the sparse data issue. By connecting two processes together in a pipeline of workflow, the errors generated in the first step (e.g., the entity set expansion step) are passed onto the second step, e.g., the errors in the entity set expansion step causes erroneous attributes extraction.

The present information extraction method overcomes these issues in the conventional information extraction methods. The present method first establishes correlations between the entities and the attributes. Based on the correlations between the entities and the attributes, candidate entities and candidate attributes are ranked in an integrated ranking process, and the target entities and target attributes are selected based in the results of the integrated ranking process. Thus, the present method effectively obviates the semantic drifting issue, the sparse data issue, and the issue of passing upstream errors to downstream processes.

With the rapid spread of digitized medical records and the availability of big data technology in healthcare, a huge amount of medical information is stored as unstructured texts or semi-structured texts. Using natural language processing technology, these unstructured and semi-structured medical texts can be converted into structured texts to reveal important medical information in these texts. Medical professionals and researchers can find useful information in these structured texts to improve the quality of operation of the medical system and reduce operating costs.

FIG. 2-14 is a flow chart illustrate an exemplary information extraction method in some embodiments according to the present disclosure. Referring to FIG. 2-14, the information extraction method in some embodiments is applied in the medical field. In some embodiments, the information extraction method is implemented in an information extraction apparatus having an input interface, a candidate medical entity extractor, a candidate attribute extractor, a ranking engine, and an output interface. The input interface is configured to input medial texts and entity seeds to the candidate medical entity extractor and the candidate attribute extractor. The candidate medical entity extractor is configured to extract candidate medical entities from the medical texts based on entity seeds, and store the extracted candidate medical entities in a candidate medical entity set. The candidate attribute extractor is configured to extract candidate attributes from the medical texts based on an attribute template and the candidate medical entities stored in the candidate medical entity set, and store the extracted candidate attributes in a candidate attribute set. The ranking engine is configured to establish an entity-attribute graph based on the entity seeds, the candidate medical entities stored in the candidate medical entity set, and the candidate attributes stored in the candidate attribute set. The ranking engine is further configured to rank the candidate medical entities and the candidate attributes based on the entity-attribute graph. The ranking engine is further configured to select target entities and target attributes based on the resulting of ranking. The output interface is configured to output the target entities to a medical entity set, and output the target attributes to an attribute set, thereby obtaining a structured text.

In another aspect, the present disclosure provides an information extraction apparatus. In some embodiments, the information extraction apparatus includes an extractor configured to extract a plurality of candidate entities and a plurality of candidate attributes from a target corpus based on a plurality of entity seeds of one or more target types in an entity seeds set; a correlator configured to establish a plurality of correlations between the plurality of candidate attributes and a plurality of entities including the plurality of candidate entities and the plurality of entity seeds; and a target selector configured to select one or more target entities from the plurality of entities and one or more target attributes from the plurality of candidate attributes based on the plurality of correlations.

FIG. 3-1 is a schematic diagram illustrating the structure of an information extraction apparatus in some embodiments according to the present disclosure. Referring to FIG. 3-1, the information extraction apparatus 300 in some embodiments includes an extractor 310, a correlator 320, and a target selector 330. The extractor 310 is configured to extract a plurality of candidate entities and a plurality of candidate attributes from a target corpus based on a plurality of entity seeds of one or more target types in an entity seeds set. The correlator 320 is configured to establish a plurality of correlations between the plurality of candidate attributes and a plurality of entities including the plurality of candidate entities and the plurality of entity seeds. The target selector 330 is configured to select one or more target entities from the plurality of entities and one or more target attributes from the plurality of candidate attributes based on the plurality of correlations. Using the present information extraction apparatus 300, the target entities and the target attributes are selected based on the correlations between the plurality of candidate attributes and a plurality of entities, obviating the semantic drifting issue in the conventional information extraction method.

FIG. 3-2 is a schematic diagram illustrating the structure of a target selector in some embodiments according to the present disclosure. Referring to FIG. 3-2, the target selector 330 in some embodiments includes a correlation ranker 331, a target entity selector 332, and a target attribute selector 333. The correlation ranker 331 is configured to obtain a ranking of the plurality of entities and a ranking of the plurality of candidate attributes based on a plurality of correlation coefficients of the plurality of correlations. The target entity selector 332 is configured to select the one or more target entities from the plurality of entities based on the ranking of the plurality of entities. The target attribute selector 333 is configured to select the one or more target attributes from the plurality of candidate attributes based on the ranking of the plurality of candidate attributes.

In some embodiments, the correlations between the entities and the attributes are represented by an entity-attribute graph. In some embodiments, the correlator 320 configured to generate an entity-attribute graph representing the plurality of correlations, each of which being a correlation between one the plurality of entities and one of the plurality of candidate attributes. The entity-attribute graph includes a plurality of nodes and a plurality of edges, each of the plurality of nodes representing one of the plurality of entities or one of the plurality of candidate attributes, each of the plurality of edges representing one of the plurality of correlations. Each of the plurality of edges is associated with a weight representing one of the plurality of correlation coefficients.

FIG. 3-3 is a schematic diagram illustrating the structure of a correlator in some embodiments according to the present disclosure. Referring to FIG. 3-3, the correlator 320 in some embodiments includes an edge generator 321, a coefficient calculator 322, and a weight assignor 323. The edge generator 321 is configured to generate an edge between nodes of one of the plurality of entities and one of the plurality of candidate attributes, thereby obtaining the plurality of edges. The coefficient calculator 322 is configured to calculate a correlation coefficient corresponding to one of the plurality of edges. The weight assignor 323 is configured to assign the correlation coefficient of the one of the plurality of edges as the weight for the one of the plurality of edges.

In some embodiments, the correlation ranker 331 is configured to calculate a score for each of the plurality of entities based on the entity-attribute graph, a score for each of the plurality of candidate attributes calculated at time t, and a score coefficient for each of the plurality of entities derived from one or more of the plurality of correlation coefficients; and calculate a score for each of the plurality of candidate attributes based on the entity-attribute graph, a score for each of the plurality of entities calculated at time t, and a score coefficient for each of the plurality of candidate attributes derived from one or more of the plurality of correlation coefficients. Optionally, the correlation ranker 331 is further configured to reiterate calculating the score for each of the plurality of entities and the score for each of the plurality of candidate attributes for a number of times.

In some embodiments, the correlation ranker 331 is configured to calculate the score for each of the plurality of entities based on Equation (1):

$$S_{t+1}(e_i) = \sum_j S_t(a_j) \times \frac{w_{i,j}}{\sum_k w_{k,j}}; \qquad (1)$$

wherein $S_{t+1}(e_i)$ stands for a score for an entity $e_i$ of the plurality of entities calculated at time (t+1), $S_t(a_j)$ stands for a score for an candidate attribute $a_j$ of the plurality of candidate attributes calculated at time t, $$\frac{w_{i,j}}{\sum_k w_{k,j}}$$

stands for the score coefficient for the plurality of entities, $w_{i,j}$ stands for a weight for an edge between a node corresponding to the entity $e_i$ and a node corresponding to the candidate attribute $a_j$, $w_{k,j}$ stands for a weight for an edge between a node corresponding to the entity $e_k$ and a node corresponding to the candidate attribute $a_j$, j stands for a number of edges connected to the node corresponding to the entity $e_i$ in the entity-attribute graph, and k stands for a number of edges connected to the node corresponding to the candidate attribute $a_j$ in the entity-attribute graph.

In some embodiments, the correlation ranker 331 is further configured to calculate the score for each of the plurality of candidate attributes based on Equation (2):

$$S_{t+1}(a_j) = \sum_i S_t(e_i) \times \frac{w_{i,j}}{\sum_k w_{i,p}}; \quad (2)$$

wherein $S_{t+1}(a_j)$ stands for a score for the candidate attribute $a_j$ of the plurality of candidate attributes calculated at time (t+1), $S_t(e_i)$ stands for a score for the entity $e_i$ of the plurality of entities calculated at time t, $$\frac{w_{i,j}}{\sum_k w_{i,p}}$$

k stands for the score coefficient for the plurality of candidate attributes, $w_{i,p}$ stands for a weight for an edge between the node corresponding to the entity $e_i$ and a node corresponding to the candidate attribute $a_p$, i stands for the number of edges connected to the node corresponding to the candidate attribute $a_j$ in the entity-attribute graph, and p stands for the number of edges connected to the node corresponding to the entity $e_i$ in the entity-attribute graph.

In some embodiments, the correlation ranker 331 is configured to reiterate calculating the score for each of the plurality of entities and the score for each of the plurality of candidate attributes for a number of times, e.g., until a ranking termination condition is satisfied. Various appropriate ranking termination conditions may be used. Optionally, the ranking termination condition is a fixed number of ranking steps. Optionally, the ranking termination condition is a convergence of score. Optionally, the correlation ranker 331 is configured to reiterate calculating the score for each of the plurality of entities and the score for each of the plurality of candidate attributes until the score for each of the plurality of entities converges, and the score for each of the plurality of candidate attributes converges.

In some embodiments, after calculating the score for each of the plurality of entities and the score for each of the plurality of candidate attributes is reiterated for the number of times, the target entity selector 332 is configured to obtain a final score for each of the plurality of entities and the target attribute selector 333 is configured to obtain a final score for each of the plurality of candidate attributes. Optionally, the correlation ranker 331 is configured to rank the plurality of entities based on the final score for each of the plurality of entities and rank the plurality of candidate attributes based on the final score for each of the plurality of candidate attributes, thereby obtaining one or more target entities and one or more target attributes.

FIG. 3-4 is a schematic diagram illustrating the structure of an extractor in some embodiments according to the present disclosure. Referring to FIG. 3-4, the extractor 310 in some embodiments includes a first sub-extractor 311, a second sub-extractor 312, and a third sub-extractor 313. The first sub-extractor 311 is configured to extract an entity extraction template from the target corpus based on each of the plurality of entity seeds in the entity seeds set, thereby obtaining a plurality of entity extraction templates. The second sub-extractor 312 is configured to extract a candidate entity from the target corpus based on each of the plurality of entity extraction templates, thereby obtaining the plurality of candidate entities. The third sub-extractor 313 is configured to extract a candidate attribute from the target corpus based on each of the plurality of plurality of candidate entities and an attribute extraction template, thereby obtaining the plurality of candidate attributes.

In some embodiments, the first sub-extractor 311 is configured to search from the target corpus a first character string relevant to one of the plurality of entity seeds, the first character string including one of the plurality of entity seeds and one or more attributes thereof and limited by a first character string length, thereby obtaining a plurality of first character strings respectively relevant to the plurality of entity seeds; and determine the entity extraction template for each of the plurality of entity seeds based on the first character string, thereby obtaining the plurality of entity extraction templates respectively for the plurality of first character strings, each of the plurality of entity extraction templates including a common entity symbol and the one or more attributes of one of the plurality of entity seeds.

In some embodiments, the second sub-extractor 312 is second sub-extractor is configured to search from the target corpus a second character string relevant to the entity extraction template, the second character string including a candidate entity and the one or more attributes of one of the plurality of entity seeds, and limited by a second character string length, thereby obtaining a plurality of second character strings respectively relevant to the plurality of entity extraction templates; and obtain the plurality of candidate entities by extracting the candidate entity from each of the plurality of second character strings.

In some embodiments, the third sub-extractor 313 is configured to search from the target corpus a third character string relevant to the candidate entity and the attribute extraction template based on the candidate entity, the third character string including the candidate entity and one or more attributes of the candidate entity, and limited by a second character string length, thereby obtaining a plurality of third character strings respectively relevant to the plurality of candidate entities; and obtain the plurality of candidate attributes by extracting the one or more attributes of the candidate entity from each of the plurality of third character strings.

Optionally, the target corpus includes one or more unstructured medical texts; and the plurality of entity seeds are a plurality of medical entities.

FIG. 3-5 is a schematic diagram illustrating the structure of an information extraction apparatus in some embodiments according to the present disclosure. Referring to FIG. 3-5, the information extraction apparatus 300 includes an extractor 310, a correlator 320, a target selector 330, a first storage module 340, and a second storage module 350. The first storage 340 is configured to store one or more target entities in a target entity set for recording entities of one or more target types. The second storage 350 is configured to store one or more target attributes in a target attribute set for recording attributes of one or more target types.

In some embodiments, the coefficient calculator 322 is configured to calculate the correlation coefficient corresponding to one of the plurality of edges based on a context in the target corpus of one of the plurality of entities and one of the plurality of candidate attributes represented by nodes connected to the one of the plurality of edges.

In some embodiments, the coefficient calculator 322 is configured to calculate the correlation coefficient corresponding to one of the plurality of edges by mapping one of the plurality of entities and one of the plurality of candidate attributes represented by nodes connected to the one of the plurality of edges to a semantic space using a neural network, and calculating the correlation coefficient corresponding to the one of the plurality of edges in the semantic space.

In some embodiments, the coefficient calculator 322 is configured to calculate the correlation coefficient corresponding to one of the plurality of edges by mapping one of the plurality of entities and one of the plurality of candidate attributes represented by nodes connected to the one of the plurality of edges to a concept space; and calculating the correlation coefficient corresponding to the one of the plurality of edges in the concept space.

In another aspect, the present disclosure further provides a non-transitory computer-readable storage medium storing computer-readable instructions. In some embodiments, the computer-readable instructions are executable by a processor to cause the processor to perform extracting a plurality of candidate entities and a plurality of candidate attributes from a target corpus based on a plurality of entity seeds of one or more target types in an entity seeds set; establishing a plurality of correlations between the plurality of candidate attributes and a plurality of entities including the plurality of candidate entities and the plurality of entity seeds; and selecting one or more target entities from the plurality of entities and one or more target attributes from the plurality of candidate attributes based on the plurality of correlations.

Optionally, selecting the one or more target entities from the plurality of entities and the one or more target attributes from the plurality of candidate attributes includes obtaining a ranking of the plurality of entities and a ranking of the plurality of candidate attributes based on a plurality of correlation coefficients of the plurality of correlations; selecting the one or more target entities from the plurality of entities based on the ranking of the plurality of entities; and selecting the one or more target attributes from the plurality of candidate attributes based on the ranking of the plurality of candidate attributes.

Optionally, establishing the plurality of correlations includes generating an entity-attribute graph representing the plurality of correlations, each of which being a correlation between one the plurality of entities and one of the plurality of candidate attributes. Optionally, the entity-attribute graph includes a plurality of nodes and a plurality of edges, each of the plurality of nodes representing one of the plurality of entities or one of the plurality of candidate attributes, each of the plurality of edges representing one of the plurality of correlations. Each of the plurality of edges is associated with a weight representing one of the plurality of correlation coefficients. Optionally, establishing the plurality of correlations further includes generating an edge between nodes of one of the plurality of entities and one of the plurality of candidate attributes, thereby obtaining the plurality of edges; calculating a correlation coefficient corresponding to one of the plurality of edges; and assigning the correlation coefficient of the one of the plurality of edges as the weight for the one of the plurality of edges.

Optionally, obtaining the ranking of the plurality of entities and the ranking of the plurality of candidate attributes includes calculating a score for each of the plurality of entities based on the entity-attribute graph, a score for each of the plurality of candidate attributes calculated at time t, and a score coefficient for each of the plurality of entities derived from one or more of the plurality of correlation coefficients; calculating a score for each of the plurality of candidate attributes based on the entity-attribute graph, a score for each of the plurality of entities calculated at time t, and a score coefficient for each of the plurality of candidate attributes derived from one or more of the plurality of correlation coefficients and reiterating calculating the score for each of the plurality of entities and the score for each of the plurality of candidate attributes for a number of times.

Optionally, obtaining the ranking of the plurality of entities and the ranking of the plurality of candidate attributes includes calculating the score for each of the plurality of entities based on Equation (1):

$$S_{t+1}(e_i) = \sum_j S_t(a_j) \times \frac{w_{i,j}}{\sum_k w_{k,j}}; \quad (1)$$

and calculating the score for each of the plurality of candidate attributes based on Equation (2):

$$S_{t+1}(a_j) = \sum_i S_t(e_i) \times \frac{w_{i,j}}{\sum_k w_{i,p}}; \quad (2)$$

wherein $S_{t+1}(e_i)$ stands for a score for an entity $e_i$ of the plurality of entities calculated at time (t+1), $S_t(a_j)$ stands for a score for an candidate attribute $a_j$ of the plurality of candidate attributes calculated at time t, $$\frac{w_{i,j}}{\sum_k w_{k,j}}$$

stands for the score coefficient for the plurality of entities, $w_{i,j}$ stands for a weight for an edge between a node corresponding to the entity $e_i$ and a node corresponding to the candidate attribute $a_j$, $w_{k,j}$ stands for a weight for an edge between a node corresponding to the entity $e_k$ and a node corresponding to the candidate attribute $a_j$, j stands for a number of edges connected to the node corresponding to the entity $e_i$ in the entity-attribute graph, and k stands for a number of edges connected to the node corresponding to the candidate attribute $a_j$ in the entity-attribute graph; $S_{t+1}(a_j)$ stands for a score for the candidate attribute $a_j$ of the plurality of candidate attributes calculated at time (t+1), $S_t(e_i)$ stands for a score for the entity $e_i$ of the plurality of entities calculated at time t, $$\frac{w_{i,j}}{\sum_k w_{i,p}}$$

stands for the score coefficient for the plurality of candidate attributes, $w_{i,p}$ stands for a weight for an edge between the node corresponding to the entity $e_i$ and a node corresponding to the candidate attribute $a_p$, i stands for the number of edges connected to the node corresponding to the candidate attribute $a_j$ in the entity-attribute graph, and p stands for the number of edges connected to the node corresponding to the entity $e_i$ in the entity-attribute graph.

Optionally, reiterating calculating the score for each of the plurality of entities and the score for each of the plurality of candidate attributes includes reiterating calculating the score for each of the plurality of entities and the score for each of the plurality of candidate attributes until the score for each of the plurality of entities converges, and the score for each of the plurality of candidate attributes converges.

Optionally, selecting the one or more target entities from the plurality of entities and the one or more target attributes from the plurality of candidate attributes includes obtaining a final score for each of the plurality of entities and a final score for each of the plurality of candidate attributes after calculating the score for each of the plurality of entities and the score for each of the plurality of candidate attributes is reiterated for the number of times; and obtaining the ranking of the plurality of entities and the ranking of the plurality of candidate attributes includes ranking the plurality of entities based on the final score for each of the plurality of entities and rank the plurality of candidate attributes based on the final score for each of the plurality of candidate attributes.

Optionally, extracting the plurality of candidate entities and the plurality of candidate attributes from a target corpus includes extracting an entity extraction template from the target corpus based on each of the plurality of entity seeds in the entity seeds set, thereby obtaining a plurality of entity extraction templates; extracting a candidate entity from the target corpus based on each of the plurality of entity extraction templates, thereby obtaining the plurality of candidate entities; and extracting a candidate attribute from the target corpus based on each of the plurality of candidate entities and an attribute extraction template, thereby obtaining the plurality of candidate attributes.

Optionally, extracting the entity extraction template from the target corpus includes searching from the target corpus a first character string relevant to one of the plurality of entity seeds, the first character string including one of the plurality of entity seeds and one or more attributes thereof, and limited by a first character string length, thereby obtaining a plurality of first character strings respectively relevant to the plurality of entity seeds; and determining the entity extraction template for each of the plurality of entity seeds based on the first character string, thereby obtaining the plurality of entity extraction templates respectively for the plurality of first character strings, each of the plurality of entity extraction templates including a common entity symbol and the one or more attributes of one of the plurality of entity seeds.

Optionally, extracting the candidate entity from the target corpus includes searching from the target corpus a second character string relevant to the entity extraction template, the second character string including a candidate entity and the one or more attributes of one of the plurality of entity seeds, and limited by a second character string length, thereby obtaining a plurality of second character strings respectively relevant to the plurality of entity extraction templates; and obtaining the plurality of candidate entities by extracting the candidate entity from each of the plurality of second character strings.

Optionally, extracting the candidate attribute from the target corpus includes searching from the target corpus a third character string relevant to the candidate entity and the attribute extraction template based on the candidate entity, the third character string including the candidate entity and one or more attributes of the candidate entity, and limited by a third character string length, thereby obtaining a plurality of third character strings respectively relevant to the plurality of candidate entities; and obtaining the plurality of candidate attributes by extracting the one or more attributes of the candidate entity from each of the plurality of third character strings.

Optionally, the target corpus includes one or more unstructured medical texts; and the plurality of entity seeds are a plurality of medical entities.

Optionally, calculating the correlation coefficient corresponding to the one of the plurality of edges includes calculating the correlation coefficient corresponding to one of the plurality of edges based on a context in the target corpus of one of the plurality of entities and one of the plurality of candidate attributes represented by nodes connected to the one of the plurality of edges.

Optionally, calculating the correlation coefficient corresponding to the one of the plurality of edges includes mapping one of the plurality of entities and one of the plurality of candidate attributes represented by nodes connected to the one of the plurality of edges to a semantic space using a neural network; and calculating the correlation coefficient corresponding to the one of the plurality of edges in the semantic space.

Optionally, calculating the correlation coefficient corresponding to the one of the plurality of edges includes mapping one of the plurality of entities and one of the plurality of candidate attributes represented by nodes connected to the one of the plurality of edges to a concept space; and calculating the correlation coefficient corresponding to the one of the plurality of edges in the concept space.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention". "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. An information extraction method, comprising:
extracting a plurality of candidate entities and a plurality of candidate attributes from a target corpus based on a plurality of entity seeds of one or more target types in an entity seeds set;
establishing a plurality of correlations between the plurality of candidate attributes and a plurality of entities comprising the plurality of candidate entities and the plurality of entity seeds; and selecting one or more target entities from the plurality of entities and one or more target attributes from the plurality of candidate attributes based on the plurality of correlations wherein selecting the one or more target entities from the plurality of entities and the one or more target attributes from the plurality of candidate attributes comprises:

obtaining a ranking of the plurality of entities and a ranking of the plurality of candidate attributes based on a plurality of correlation coefficients of the plurality of correlations;

selecting the one or more target entities from the plurality of entities based on the ranking of the plurality of entities; and selecting the one or more target attributes from the plurality of candidate attributes based on the ranking of the plurality of candidate attributes;

wherein establishing the plurality of correlations comprises generating an entity-attribute graph representing the plurality of correlations, each of which being a correlation between one the plurality of entities and one of the plurality of candidate attributes;

the entity-attribute graph comprises a plurality of nodes and a plurality of edges, each of the plurality of nodes representing one of the plurality of entities or one of the plurality of candidate attributes, each of the plurality of edges representing one of the plurality of correlations;

each of the plurality of edges is associated with a weight representing one of the plurality of correlation coefficients;

wherein establishing the plurality of correlations further comprises generating an edge between nodes of one of the plurality of entities and one of the plurality of candidate attributes, thereby obtaining the plurality of edges, a respective one of the plurality of edges is between a respective one of the plurality of entities and a respective one of the plurality of candidate attributes;

calculating a correlation coefficient corresponding to one of the plurality of edges; and assigning the correlation coefficient of the one of the plurality of edges as the weight for the one of the plurality of edges;

wherein obtaining the ranking of the plurality of entities and the ranking of the plurality of candidate attributes comprises:

calculating a score for each of the plurality of entities based on the entity-attribute graph, a score for each of the plurality of candidate attributes calculated at time t, and a score coefficient for each of the plurality of entities derived from one or more of the plurality of correlation coefficients;

calculating a score for each of the plurality of candidate attributes based on the entity-attribute graph, a score for each of the plurality of entities calculated at time t, and a score coefficient for each of the plurality of candidate attributes derived from one or more of the plurality of correlation coefficients; and reiterating calculating the score for each of the plurality of entities and the score for each of the plurality of candidate attributes for a number of times.

2. The information extraction method of claim 1, wherein obtaining the ranking of the plurality of entities and the ranking of the plurality of candidate attributes comprises:

calculating the score for each of the plurality of entities based on Equation (1):

$$S_{t+1}(e_i) = \sum_j S_t(a_j) \times \frac{w_{i,j}}{\sum_k w_{k,j}}; \quad (1)$$

and calculating the score for each of the plurality of candidate attributes based on Equation (2):

$$S_{t+1}(a_j) = \sum_i S_t(e_i) \times \frac{w_{i,j}}{\sum_k w_{i,p}}; \quad (2)$$

wherein $S_{t+1}(e_i)$ stands for a score for an entity $e_i$ of the plurality of entities calculated at time (t+1), $S_t(a_j)$ stands for a score for an candidate attribute $a_j$ of the plurality of candidate attributes calculated at time t, $$\frac{w_{i,j}}{\sum_k w_{k,j}}$$

stands for the score coefficient for the plurality of entities, $w_{i,j}$ stands for a weight for an edge between a node corresponding to the entity $e_i$ and a node corresponding to the candidate attribute $a_j$, $w_{k,j}$ stands for a weight for an edge between a node corresponding to the entity $e_k$ and a node corresponding to the candidate attribute $a_j$, j stands for a number of edges connected to the node corresponding to the entity $e_i$ in the entity-attribute graph, and k stands for a number of edges connected to the node corresponding to the candidate attribute $a_j$ in the entity-attribute graph;

$S_{t+1}(a_j)$ stands for a score for the candidate attribute $a_j$ of the plurality of candidate attributes calculated at time (t+1), $S_t(e_i)$ stands for a score for the entity $e_i$ of the plurality of entities calculated at time t, $$\frac{w_{i,j}}{\sum_k w_{i,p}}$$

stands for the score coefficient for the plurality of candidate attributes, $w_{i,p}$ stands for a weight for an edge between the node corresponding to the entity $e_i$ and a node corresponding to the candidate attribute $a_p$, i stands for the number of edges connected to the node corresponding to the candidate attribute $a_j$ in the entity-attribute graph, and p stands for the number of edges connected to the node corresponding to the entity $e_i$ in the entity-attribute graph.

3. The information extraction method of claim 1, wherein reiterating calculating the score for each of the plurality of entities and the score for each of the plurality of candidate attributes comprises:

reiterating calculating the score for each of the plurality of entities and the score for each of the plurality of candidate attributes until the score for each of the plurality of entities converges, and the score for each of the plurality of candidate attributes converges.

4. The information extraction method of claim 1, wherein selecting the one or more target entities from the plurality of entities and the one or more target attributes from the plurality of candidate attributes comprises obtaining a final score for each of the plurality of entities and a final score for each of the plurality of candidate attributes after calculating the score for each of the plurality of entities and the score for each of the plurality of candidate attributes is reiterated for the number of times; and obtaining the ranking of the plurality of entities and the ranking of the plurality of candidate attributes comprises ranking the plurality of entities based on the final score for each of the plurality of entities and rank the plurality of candidate attributes based on the final score for each of the plurality of candidate attributes.

5. The information extraction method of claim 1, wherein extracting the plurality of candidate entities and the plurality of candidate attributes from a target corpus comprises:

extracting an entity extraction template from the target corpus based on each of the plurality of entity seeds in the entity seeds set, thereby obtaining a plurality of entity extraction templates;

extracting a candidate entity from the target corpus based on each of the plurality of entity extraction templates, thereby obtaining the plurality of candidate entities; and extracting a candidate attribute from the target corpus based on each of the plurality of candidate entities and an attribute extraction template, thereby obtaining the plurality of candidate attributes.

6. The information extraction method of claim 5, wherein extracting the entity extraction template from the target corpus comprises:

searching from the target corpus a first character string relevant to one of the plurality of entity seeds, the first character string comprising one of the plurality of entity seeds and one or more attributes thereof, and limited by a first character string length, thereby obtaining a plurality of first character strings respectively relevant to the plurality of entity seeds; and determining the entity extraction template for each of the plurality of entity seeds based on the first character string, thereby obtaining the plurality of entity extraction templates respectively for the plurality of first character strings, each of the plurality of entity extraction templates comprising a common entity symbol and the one or more attributes of one of the plurality of entity seeds.

7. The information extraction method of claim 6, wherein extracting the candidate entity from the target corpus comprises:

searching from the target corpus a second character string relevant to the entity extraction template, the second character string comprising a candidate entity and the one or more attributes of one of the plurality of entity seeds, and limited by a second character string length, thereby obtaining a plurality of second character strings respectively relevant to the plurality of entity extraction templates; and obtaining the plurality of candidate entities by extracting the candidate entity from each of the plurality of second character strings.

8. The information extraction method of claim 7, wherein extracting the candidate attribute from the target corpus comprises:

searching from the target corpus a third character string relevant to the candidate entity and the attribute extraction template based on the candidate entity, the third character string comprising the candidate entity and one or more attributes of the candidate entity, and limited by a third character string length, thereby obtaining a plurality of third character strings respectively relevant to the plurality of candidate entities; and obtaining the plurality of candidate attributes by extracting the one or more attributes of the candidate entity from each of the plurality of third character strings.

9. The information extraction method of claim 1, wherein the target corpus comprises one or more unstructured medical texts; and the plurality of entity seeds are a plurality of medical entities.

10. The information extraction method of claim 1, wherein calculating the correlation coefficient corresponding to the one of the plurality of edges comprises calculating the correlation coefficient corresponding to one of the plurality of edges based on a context in the target corpus of one of the plurality of entities and one of the plurality of candidate attributes represented by nodes connected to the one of the plurality of edges.

11. The information extraction method of claim 1, wherein calculating the correlation coefficient corresponding to the one of the plurality of edges comprises:

mapping one of the plurality of entities and one of the plurality of candidate attributes represented by nodes connected to the one of the plurality of edges to a semantic space using a neural network; and calculating the correlation coefficient corresponding to the one of the plurality of edges in the semantic space.

12. The information extraction method of claim 1, wherein calculating the correlation coefficient corresponding to the one of the plurality of edges comprises:

mapping one of the plurality of entities and one of the plurality of candidate attributes represented by nodes connected to the one of the plurality of edges to a concept space; and calculating the correlation coefficient corresponding to the one of the plurality of edges in the concept space.

13. An information extraction apparatus, comprising:

an extractor configured to extract a plurality of candidate entities and a plurality of candidate attributes from a target corpus based on a plurality of entity seeds of one or more target types in an entity seeds set;

a correlator configured to establish a plurality of correlations between the plurality of candidate attributes and a plurality of entities comprising the plurality of candidate entities and the plurality of entity seeds; and a target selector configured to select one or more target entities from the plurality of entities and one or more target attributes from the plurality of candidate attributes based on the plurality of correlations;

wherein the target selector comprises:

a correlation ranker configured to obtain a ranking of the plurality of entities and a ranking of the plurality of candidate attributes based on a plurality of correlation coefficients of the plurality of correlations;

a target entity selector configured to select the one or more target entities from the plurality of entities based on the ranking of the plurality of entities; and a target attribute selector configured to select the one or more target attributes from the plurality of candidate attributes based on the ranking of the plurality of candidate attributes;

wherein the correlator configured to generate an entity-attribute graph representing the plurality of correlations, each of which being a correlation between one the plurality of entities and one of the plurality of candidate attributes;

the entity-attribute graph comprises a plurality of nodes and a plurality of edges, each of the plurality of nodes representing one of the plurality of entities or one of the plurality of candidate attributes, each of the plurality of edges representing one of the plurality of correlations;

each of the plurality of edges is associated with a weight representing one of the plurality of correlation coefficients;

the correlator comprises:

an edge generator configured to generate an edge between nodes of one of the plurality of entities and one of the plurality of candidate attributes, thereby obtaining the plurality of edges, a respective one of the plurality of edges is between a respective one of the plurality of entities and a respective one of the plurality of candidate attributes;

a coefficient calculator configured to calculate a correlation coefficient corresponding to one of the plurality of edges; and a weight assignor configured to assign the correlation coefficient of the one of the plurality of edges as the weight for the one of the plurality of edges;

wherein the correlation ranker is configured to:

calculate a score for each of the plurality of entities based on the entity-attribute graph, a score for each of the plurality of candidate attributes calculated at time t, and a score coefficient for each of the plurality of entities derived from one or more of the plurality of correlation coefficients;

calculate a score for each of the plurality of candidate attributes based on the entity-attribute graph, a score for each of the plurality of entities calculated at time t, and a score coefficient for each of the plurality of candidate attributes derived from one or more of the plurality of correlation coefficients; and reiterate calculating the score for each of the plurality of entities and the score for each of the plurality of candidate attributes for a number of times.

14. The information extraction apparatus of claim 13, wherein the correlation ranker is configured to:

extracting a plurality of candidate entities and a plurality of candidate attributes from a target corpus based on a plurality of entity seeds of one or more target types in an entity seeds set;

establishing a plurality of correlations between the plurality of candidate attributes and a plurality of entities comprising the plurality of candidate entities and the plurality of entity seeds; and selecting one or more target entities from the plurality of entities and one or more target attributes from the plurality of candidate attributes based on the plurality of correlations.

* * * * *